United States Patent
Datta et al.

(10) Patent No.: US 12,547,530 B1
(45) Date of Patent: Feb. 10, 2026

(54) SYNTHETIC DATA GENERATION AND MACHINE LEARNING MODEL TESTING

(71) Applicant: Amazon Technologies, Inc., Seattle, WA (US)

(72) Inventors: Debanjan Datta, Seattle, WA (US); Gerald Friedland, Alameda, CA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 18/469,367

(22) Filed: Sep. 18, 2023

(51) Int. Cl.
G06F 11/3668 (2025.01)

(52) U.S. Cl.
CPC ...... *G06F 11/3684* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 6,298,317 | B1* | 10/2001 | Wiemann | G06F 11/3688 703/22 |
| 2013/0139003 | A1* | 5/2013 | Patwardhan | G06F 11/3684 714/E11.207 |
| 2014/0325251 | A1* | 10/2014 | Marwah | G06F 1/14 713/500 |
| 2015/0134823 | A1* | 5/2015 | Cucinotta | H04L 47/2425 709/226 |
| 2018/0074944 | A1* | 3/2018 | Hirt | G06F 8/34 |
| 2020/0019489 | A1* | 1/2020 | Shanmugam | G06F 11/3684 |
| 2020/0410403 | A1* | 12/2020 | Kamulete | G06N 5/01 |
| 2021/0312064 | A1* | 10/2021 | Arthur | G06F 21/6254 |
| 2023/0043547 | A1* | 2/2023 | Pagolu | G06F 11/3692 |
| 2023/0060848 | A1* | 3/2023 | Beigi | G06F 18/2163 |
| 2023/0068513 | A1* | 3/2023 | Kundu | G06N 5/022 |
| 2023/0132501 | A1* | 5/2023 | Phillippe | G06F 11/0769 714/38.1 |
| 2023/0138763 | A1* | 5/2023 | Walters | G06F 18/214 382/159 |
| 2023/0195601 | A1* | 6/2023 | Poornachandran | G06N 20/00 717/124 |
| 2023/0306291 | A1* | 9/2023 | Schatz | G06F 18/295 |
| 2024/0078289 | A1* | 3/2024 | Gollapudi | G06F 11/3696 |

OTHER PUBLICATIONS

Cedric Renggli et al., "Automatic Feasibility Study via Data Quality Analysis for ML: A Case-Study on Label Noise." IEEEInternational Conference on Data Engineering (ICDE). (2023), 1-14.

(Continued)

*Primary Examiner* — Qing Chen
(74) *Attorney, Agent, or Firm* — Nicholson De Vos Webster & Elliott LLP

(57) ABSTRACT

Techniques for generating synthetic data and/or machine learning model testing are described. For example, synthetic data may be generated according to a request by selecting one or more transformation modules to be used to generate synthetic data, instantiating the selected one or more transformation modules, and applying the selected one or more transformation modules in a defined order to at least one dataset to generate synthetic data.

20 Claims, 15 Drawing Sheets

(56) References Cited

OTHER PUBLICATIONS

Dominik Kreuzberger et al., "Machine Learning Operations (MLOps): Overview, Definition, and Architecture." arXiv preprint arXiv:2205.02302 (2022)., 1-13.

Jan Bosch et al., "Engineering ai systems: A research agenda." ArtificialIntelligence Paradigms for Smart Cyber-Physical Systems, Jun. 3, 2020, 1-8.

Jie M. Zhang et al., "Machine learning testing: Survey, landscapes and horizons." IEEE Transactions on SoftwareEngineering, Dec. 21, 2019, 1-37.

Leonel Aguilar et al., "Ease. ML: A lifecycle management system for MLDev and MLOps." Proc. of Innovative DataSystems Research (2021)., 1-7.

Rob Ashmore et al., Assuring the Machine Learning Lifecycle: Desiderata,Methods, and Challenges. ACM Comput. Surv. 54, 5, Article 111 (May 2021), 1-39.

Zheng, Wujie, et al., "Testing untestable neural machine translation: An industrial case." 2019 IEEE/ACM 41stInternational Conference on Software Engineering: Companion Proceedings (ICSE-Companion). IEEE, 2019, 1-10.

* cited by examiner

SYNTHETIC DATA GENERATION

SELECT DATASET(S) 401

[ PATH(S) ▼ ]

SAVE LOCATION FOR TRANFORMED DATASET(S) 403

[ PATH(S) ▼ ]

TRANSFORMATION TYPE (MODULE SELECTION) 405

[ NAME(S) ▼ ]

ENTROPY 407

[ VALUE ▼ ]

[ COLUMN(S) ]

( CANCEL )  ( GENERATE )

*FIG. 4*

OVERVIEW    SCORING    TRAINING    TESTS

SELECT DATASET(S) 601

| PATH(S) |

SELECT MODEL(S) 603

| PATH(S) |

SELECT TEST(S) 605

| NAME(S) ▼ |

CANCEL    TEST

*FIG. 6*

SYNTHETIC DATA GENERATION AND MACHINE LEARNING MODEL TESTING

BACKGROUND

Machine learning (ML) based systems such as automatic ML (AutoML) systems function differently from traditional software systems. Their output is a function of not only the model, but the data, hyperparameters and user-provided constraints. In traditional software systems, software development operations (DevOps) play a crucial role of enabling tests, continuous integration, delivery and monitoring.

BRIEF DESCRIPTION OF DRAWINGS

Various examples in accordance with the present disclosure will be described with reference to the drawings, in which:

FIG. 4 illustrates examples of a graphical user interface for synthetic data generation using a synthetic data generator.

FIG. 6 illustrates examples of a graphical user interface to invoke one or more of ML tests.

DETAILED DESCRIPTION

The present disclosure relates to methods, apparatus, systems, and non-transitory computer-readable storage media for generating synthetic data and/or utilizing synthetic data in ML model testing.

In ML based systems, the paradigm of DevOps may be inadequate due to the different nature of the operational interface and parameters. ML-based systems are often opaque, black-box systems where the relationship between input and output is not always clear in terms of how it was decided. While interpretability or post-hoc explainability might help users explain individual predictions, the trustworthiness of a ML system is generally not satisfactory. Additionally, explainability is slow and scaling up is a challenge. Unit and functional tests for traditional software systems are designed to capture edge cases and major functional patterns. Their utility is limited in ML-based systems, such as AutoML systems. As such, users lack insights into the robustness of ML based systems and may have lack of trust due to inadequate tests, metrics, and observational artifacts.

Robustness and model performance monitoring ability for the user is one of the key paradigms or tenets of effective ML operations (MLOps). ML systems such as AutoML systems have referred to as inherently untestable software systems. A reason for this is that unlike traditional software systems ML systems do not have a fixed or predictable output for a known input. This is due to two main reasons. First, there can be inputs with its own set of implicit characteristics without exact known bounds a priori, even if they follow specific schema or templates (e.g., data types). Second, ML systems are designed to operate based on the data, learning patterns from the data. An objective of examples detailed herein is to enable the user to inspect, interpret and monitor the performance of the ML model, trained with the data provided by the customer with key metrics and visualizations. This may allow for trust, performance improvements, transparency, and interpretability at different levels of complexity.

Detailed herein are examples of a suite (framework) of tests that provide greater insights to the end-user. The test suite is user facing and presents to the user an evaluation of the underlying ML model based on specific (novel) metrics that are outcomes of the specific tests designed according to aforementioned objective. Additionally, in some examples, a synthetic data generation framework for tabular data is described. This framework may be used to provide a part of the data that drives the test framework.

Figure 1:
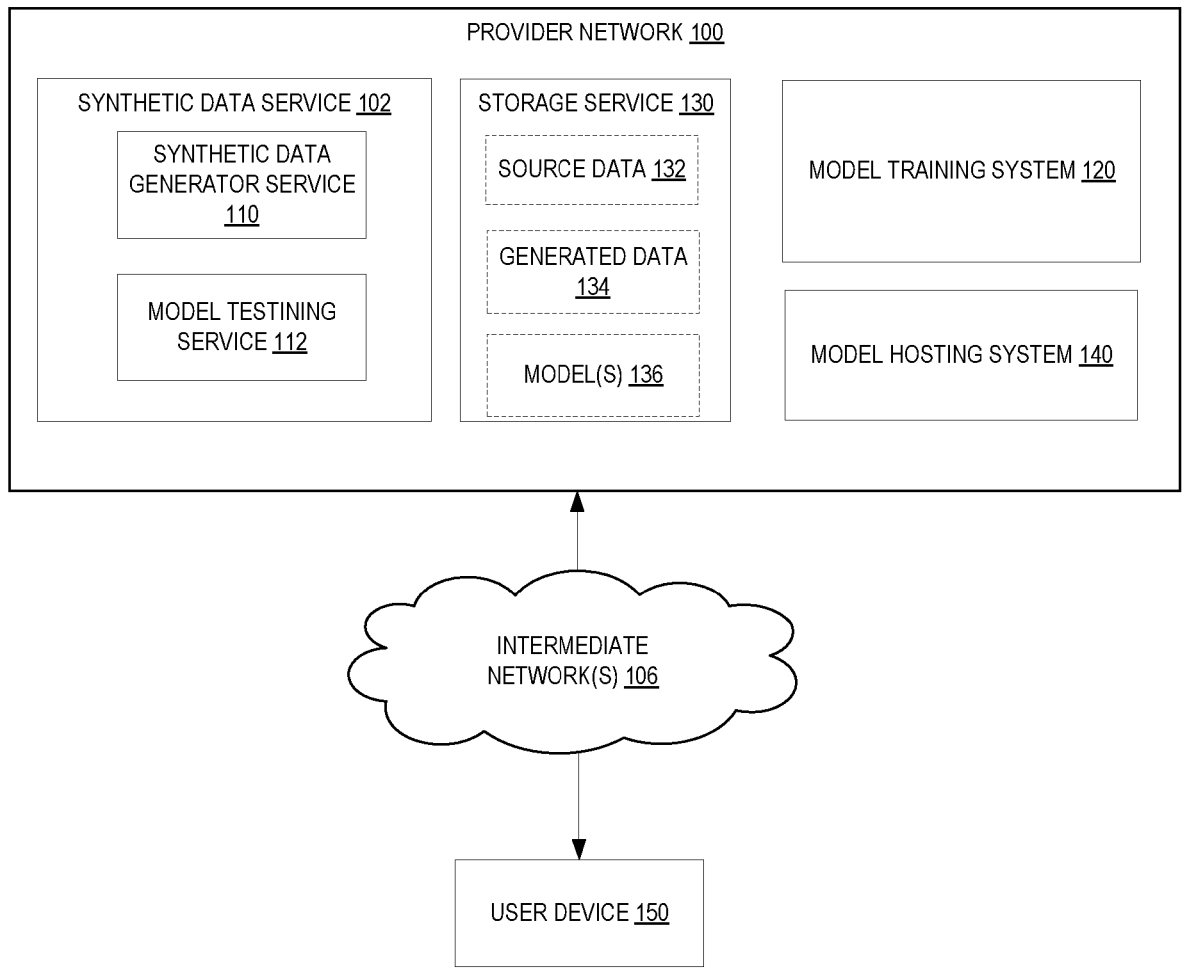
FIG. 1 illustrates examples that include a synthetic data service of a provider network.

FIG. 1 illustrates examples that include a synthetic data service of a provider network. In this illustration, a synthetic data service 102 includes a synthetic data generator service 110 and/or a model testing service 112. Note that these two services (110 and 112) may be independent of the synthetic data service 102, combined into a single service (as a part of the synthetic data service 102 or external to it), etc. Note that the synthetic data generator service 110 and/or a model testing service 112 may also be software (e.g., software tools) that are not a part of a provider network's offerings.

In low code, no code (LCNC) systems there is a possibility of users bringing in datasets with varied characteristics and defects or errors. Real world data can have multiple imperfections that manifests in a myriad of ways and scenarios, especially in an automated ML system where the service does not have control over the customers data source and generating mechanism. Data can have multiple issues, and not in isolation i.e. most issues are not mutually exclusive. For instance a dataset with classification task may have both missing values and class imbalance. While some of these errors are simple enough to detect and address, there are other cases which need a more fine-grained approach to understand their effect on model performance. The synthetic data generator service 110 generates synthetic datasets with engineered (known) characteristics (perturbations/transformations) that aid in the assessment of performance.

The synthetic data generator service 110 produces transformations layered to simulate real-world (hypothesized) data generation process using a configurable policy of transformations. In some examples, this policy is pre-defined, but can be updated by a user. The policy allows for a probabilistic selection with user configurable (and default probabilities pre-set) transformations if the user requires it.

The synthetic data generator service 110 generates synthetic, tabular data (generated data 134) from one or more existing datasets. The synthetic data generator service 110 can operate on a single dataset or multiple datasets (e.g., based on user choice) to generate synthetic data. The synthetic data generator service 110 generates patterns dynamically while ensuring that the transformations are coherent and preserve data statistics (wherever intended).

The general approach toward handling issues in data consists of semi-automated processes to address them such as missing values are imputed automatically based on a pre-defined strategy or user selected approach. Another approach that may be adopted is to fail gracefully under certain scenarios.

The synthetic data generator service 110 is configurable and each individual perturbation can be individually set to be included or not. In some examples, a user can allow a random set of transformations by passing an argument. The random combination of simulated data issues can simulate intricate and complex data issues that provide a high bar for the ML system to pass and allows for a user to observe and analyze system behavior.

An auxiliary functionality included in this tool is to independently generate a dataset without any base dataset. The generated dataset can be configured to have a certain number of user provided attribute types. This type of a random dataset allows for ML model performance baselining, since random data is a base-case that should not have discoverable pattern or information The user interface allows for the user to select (through a GUI) whether batch model or individual dataset to transform, a specific transformation on a base dataset, case (batch/individual) specific transformation options, and/or output options.

The model testing service 112 provides one or more tests to apply to a ML model. These tests may output visualizations and metrics that measure the different aspects as detailed below.

In some examples, one or both of the synthetic data generator service 110 and the model testing service 112 utilizes source data 132 stored by a storage service 130 of the provider network 100.

In some examples, a model training system 120 trains machine learning models such as model(s) 136. In some examples, the synthetic data service 102 is a part of the model training system 120. In some examples, the synthetic data service 102 is a part of a low code, no code (LCNC) aspect of the model training system 120 (or provider network 100 as a whole) that that allows users to create ML models without the requirement of advanced knowledge of writing code, designing machine learning models and associated intricacies.

In some examples, a model hosting system 140 hosts trained models such as model(s) 136.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 using a user device 150 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Figure 2:
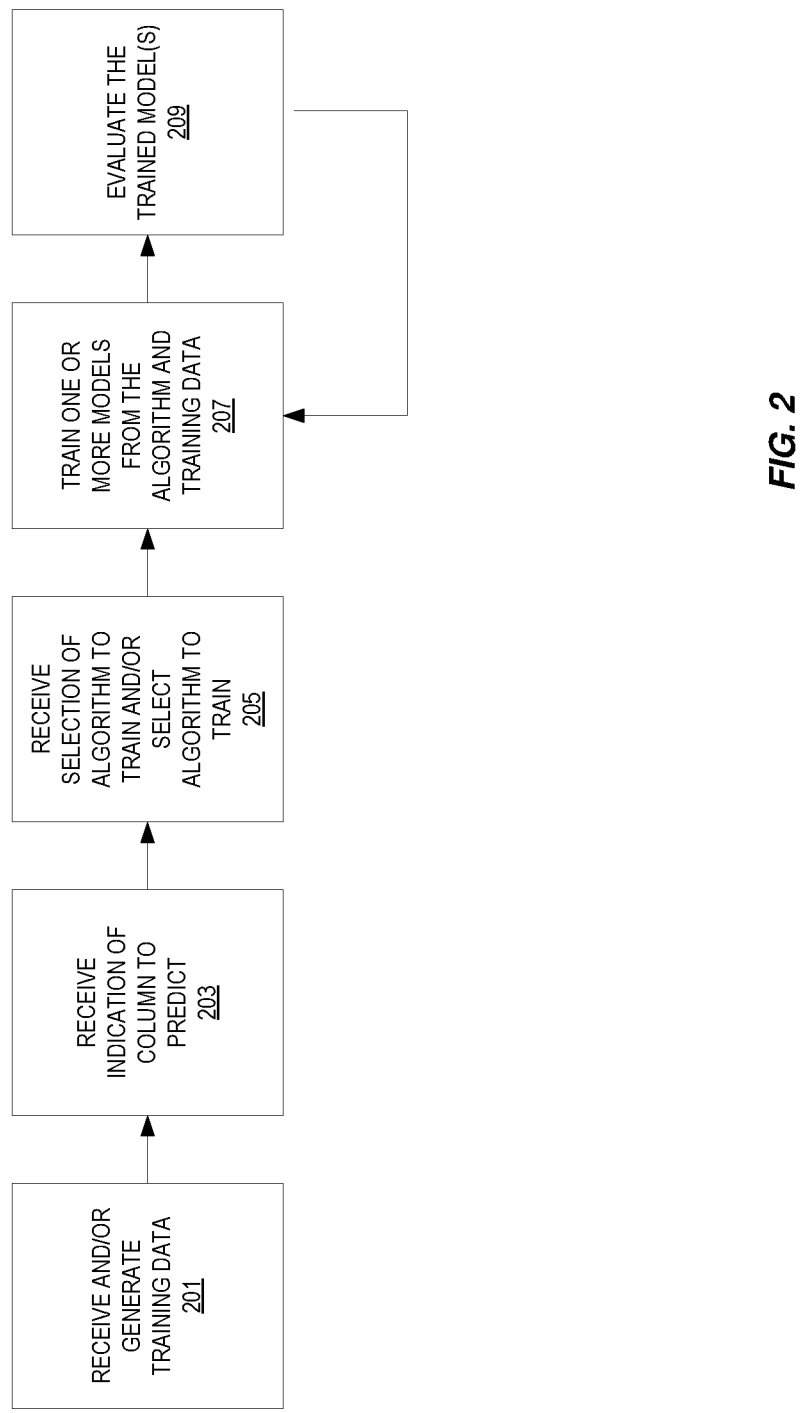
FIG. 2 illustrates examples acts performed using a low code, no code service.

FIG. 2 illustrates examples acts performed using a low code, no code service. A LCNC service allows a user to access ready-to-use models or create custom models to extract information and generate predictions. Note that the acts shown may be in a different order. In some examples, a LCNC service is an offering of a model training system 120.

In some examples, training data is received and/or generated at 201. The data can come from disparate sources and can be generated using the synthetic data generator 110.

One or more values to be predicted are received from a user at 203. For example, a column is selected in a tabular dataset.

A selection of an algorithm to train is received from a user and/or a selection is made automatically at 205. Note that while algorithm is used here, a model may also be selected to retrain or fine-tune. In some examples, the receiving of the selection of an algorithm to train is performed before the receipt of training data. Examples of models generated from algorithms include, but are not limited to sentiment analysis, object detection in images, or document analysis.

One or more models are trained from the algorithm (or re-trained) using the received and/or generated training data at 207.

The one or more models are evaluated at 209. This evaluation may utilize one or more tests of the model testing service 112. In some instances, a model is retrained based on the result(s) of the evaluations.

Figure 3:
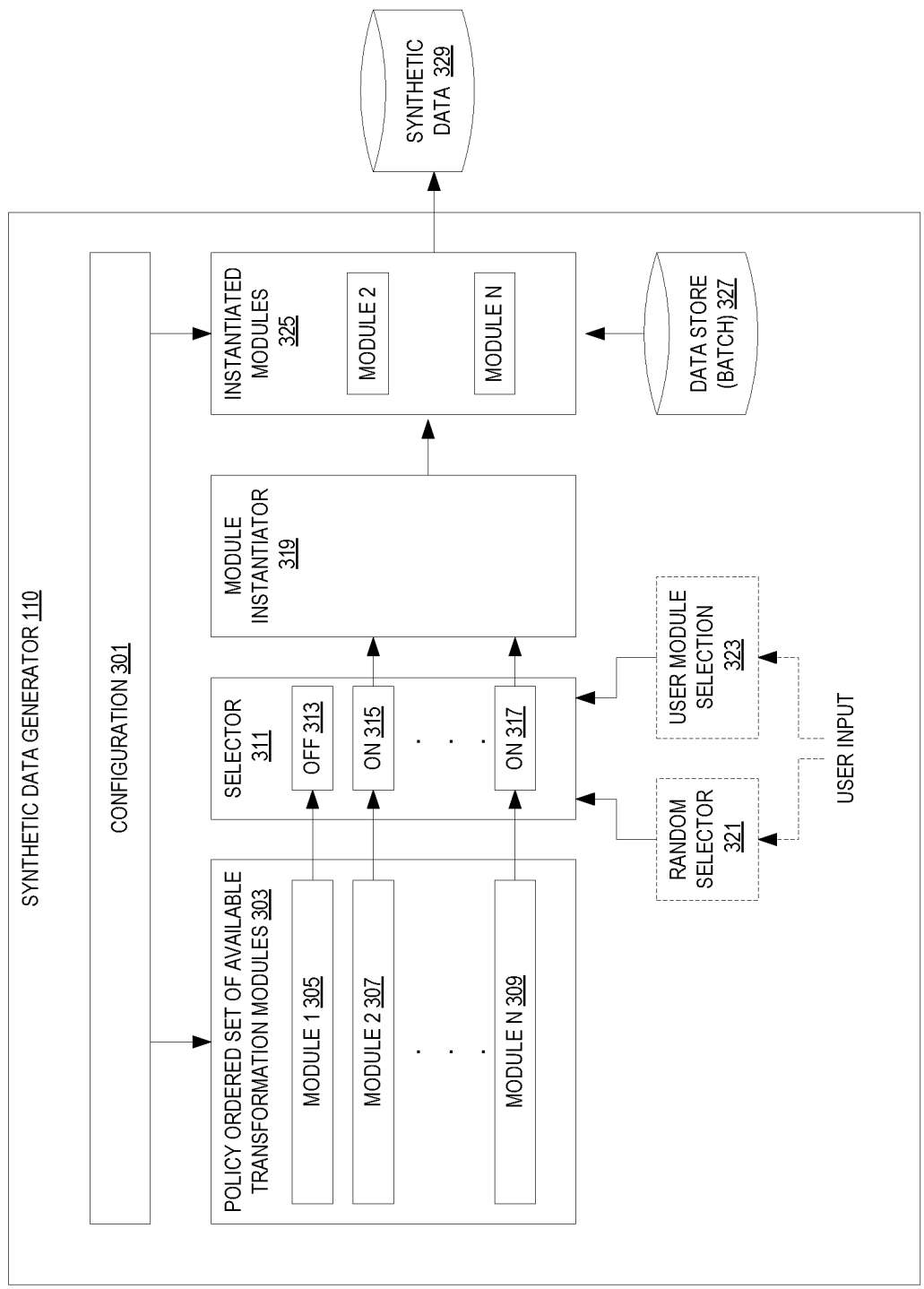
FIG. 3 illustrates examples of a synthetic data generator.

FIG. 3 illustrates examples of a synthetic data generator. In some examples, this illustration is of the synthetic data generator 110. In some examples, the synthetic data generator 110 utilizes a configuration 301. The configuration 301 sets a policy order for transformation modules 303 (e.g., what order the modules are to be implemented when transforming data—e.g., if module 1 305 and module 2 307 are to be used that module 1 305 goes first, if module 1 305 and module N 309 are to be used that module N 309 goes first, etc.). This order is utilized by instantiated modules 325. In some examples, the configuration 301 sets what modules are available for a given user. In some examples, the order is user configurable.

The table below describe example transformation modules 303, what they do, and example usages.

| Transformation Module | Description of Module Transformation | Example Usages |
| --- | --- | --- |
| Class Imbalance | Generate datasets where labels have different numbers of samples. | Allows for a performance comparison of a ML model under varying conditions of class imbalance. Class imbalance may cause a model to perform poorly on minority classes due to under-fitting. |
| Missing Values | Add missing values into a dataset. | Allows for a performance comparison of a preprocessing pipeline and ML model in the presence of missing values. This aids in the understanding of a model's performance with different levels and patterns of missing values. |
| Outliers | Add a set of outliers to a dataset. | Allows for a performance comparison of a preprocessing pipeline and ML model in the presence of anomalies. Real world data often has outliers or anomalies, for example, due to noise in data collection, reporting errors, miscalibration, etc. This module generates and injects outliers with tunable parameters toward a degree of anomalies (outliers) in the dataset. |
| Duplicate Data Points | Insert duplicate rows with the same features values and target column values. | Allows for performance monitoring of a ML model for overfitting. |
| Contradictory Labels | Insert rows with the same feature values, but different target column values. | Allows for performance monitoring of a ML model for bias introduced by non-informative data. |
| Data Distribution Change in Numeric Attributes | Changes the distribution of all the numeric columns (values are uniformly and randomly distributed). | Allows for performance monitoring of a ML to observe feature selection and downstream performance. |
| Entropy Decrease or Increase | Increase or decrease entropy of a column. In some examples, a column is selected at random. For entropy decrease, all values are the same, but one. | Allows for performance comparison of a ML model by simulation of data attributes with various entropy values that can affect a ML model's capacity and learning. |
| Fix Entropy | Set a user selected column's entropy to either 0, 0.5, or 1 for a particular column in an individual dataset. | Allows for performance comparison of a ML model through created specific cases where a model has to deal with data with columns with |

| Transformation Module | Description of Module Transformation | Example Usages |
| --- | --- | --- |
| | | distributional shift. |
| Random Column | Adding a random column with numerical values that are uniformly distributed. The entropy is 1. | Allows for performance comparison of a pre-processing pipeline and a ML model to check if a model is biased or affect by non-informative features and if feature selection is effective. |
| Fixed Column | Adding a column with fixed values—either numeric or discrete attributes. | Allows for performance comparison of a pre-processing pipeline and a ML model to check how a model handles non-informative data. That is a fixed column is inherently not informative, but affects data pre-processing, and feature selection and engineering pipeline. |

A selector 311 selects one or more modules 303 to be instantiated. In this illustration, module 1 305 is selected to be off 313, module 2 307 is selected to be on 315, and module N 309 is selected to be on 317. The selection may be based on user input. For example, a user may request a random selection using a random selector 321. In some examples, a user provides a module selection 323.

A module instantiator 319 instantiates the selected modules (shown as instantiated modules' A25).

The instantiated modules 325 transform data from a data store 327 to generate synthetic data 329. In some examples, a batch of datasets is transformed. In some examples, individual datasets are transformed.

FIG. 4 illustrates examples of a graphical user interface for synthetic data generation using a synthetic data generator. In particular, this graphical user interface (GUI) is used to request a data transformation. A user may select one or more datasets to transform using a selection input 401. One or more locations for storing resultant transformed dataset(s) may also be input using a save location input 403.

In some examples, a user uses a transformation type input 405 to select one or more modules to use in the transformation process. In some examples, the selection may be for the synthetic data generator to randomly select one or more modules.

In some examples, a user uses an entropy input 407 to provide an entropy value. For example, a user may select a particular column's entropy to either 0, 0.5, or 1.

Figure 5:
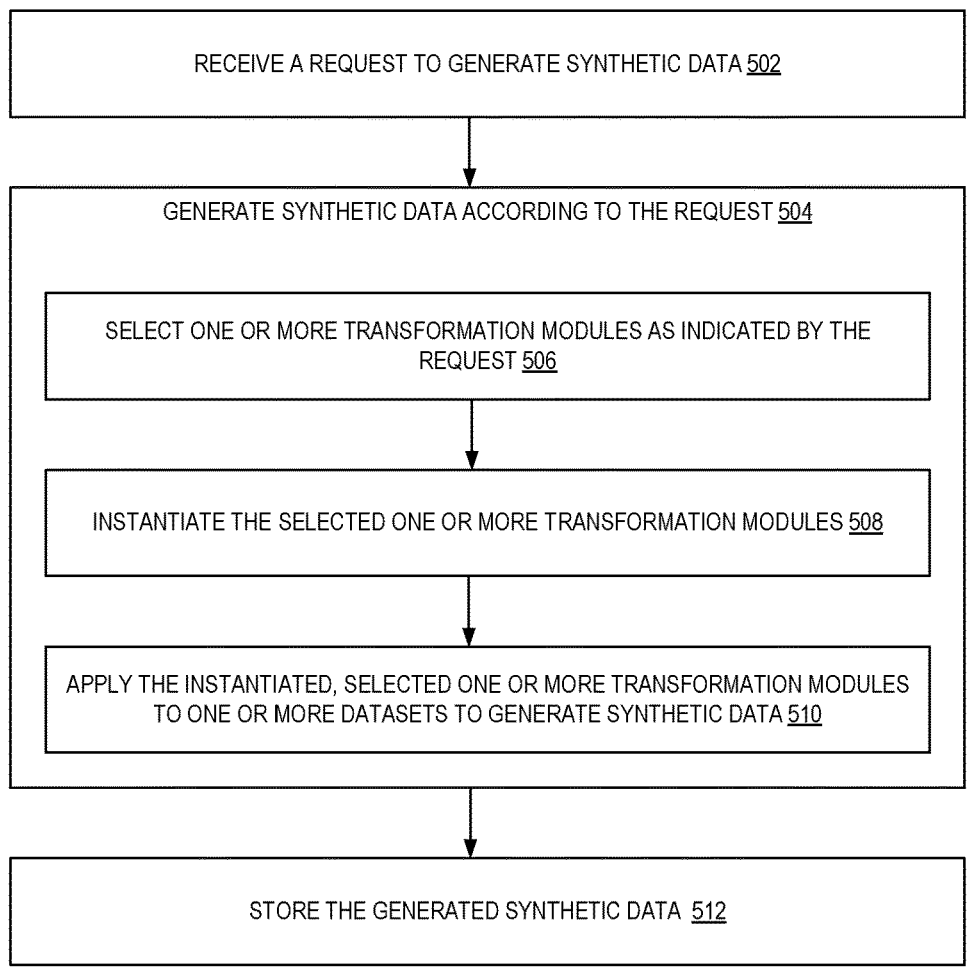
FIG. 5 is a flow diagram illustrating operations of a method for at least generating synthetic data according to some examples.

FIG. 5 is a flow diagram illustrating operations of a method for at least generating synthetic data according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the synthetic data generator service 110 of the other figures.

In some examples, a request to generate synthetic data is received at 502. This request may include one or more of: an indication of a location of at least one source dataset to transform, at least one source dataset to transform, an indication of a location to store at least one generated synthetic dataset, an indication of one or more transformation modules to use in the generating of the synthetic dataset, an indication to use a random set of one or more transformation modules, an indication of a goal for the generated synthetic dataset, an indication of entropy to use for one or more columns, an identifier per column to have its entropy changed, an indication of order of one or more transformation modules to use in the generating of the synthetic dataset, an indication of order for one or more transformation modules, etc. In some examples, the request is received via a GUI. In some examples, the request comprises one or more application programming interface (API) calls.

Synthetic data is generated according to the request at 504. One or more transformation modules are selected as indicated by the request at 506. In some examples, the selection is randomly made. In some examples, a goal for the synthetic data generation outcome is used by the synthetic data generator service 110 to select transformation modules (and their order). In some examples, the goal is based on a subsequent test to perform. In some examples, a user provides the module selection indication and/or order.

The selected one or more transformation modules are instantiated at 508. In some examples, if there are resource constraints, the transformation modules are instantiated as needed.

The instantiated, selected one or more transformation modules are applied (in order) to one or more source datasets to generate synthetic data at 510. In some examples, the one or more source datasets are provided as a part of the request. In some examples, a location or locations for the one or more source datasets are provided as a part of the request.

The generated synthetic data is stored at 512 in some examples. The storage location may be provided by the request.

The model testing service 112 provides a set of tests that output visualizations and metrics that measure the different aspects. The table below illustrate examples of one or more tests that are performed using the model testing service 112 in some examples.

| TEST NAME | OUTPUT | TEST |
|---|---|---|
| Bias | Histogram of label distributions | Generate label distributions of outcomes of cases where test data is perturbed versus perturbed. AND/OR Determine a relative Kullback-Leibler (KL)-divergence for bias to quantify stability of a model. The relative KL-divergence is calculated, in some examples, as a ratio of distributions between training data and test data with and without the injection of increased entropy. Relative KL-divergence may be defined as k1/k2 where k1 is the KL-divergence of the label distribution of a perturbed test set and a label distribution of a training set and K2 is the KL-divergence of the label distribution of an unperturbed test set and a label distribution of a training set. When the relative KL-divergence is greater than 1 it can be an indication of bias. |
| Continuous Evaluation | Measurement of relative change for a metric | Evaluate a ML model on consecutive subsets of test data and measure a relative change in performance in terms of an evaluation metric (e.g., F1, accuracy, etc.). In some examples, the evaluation metric is selectable. |
| Crash Test | Mean weighted consistency that quantifies a prediction of individual data points when each feature receives an out-of-bounds value | Calculate a mean weighted consistency (MWC) value. A MWC value may be used to quantify a degree a ML model remains consistent when numerical features are perturbed beyond their known feature ranges. A weighted consistency may be defined as the accuracy (e.g., F1 macro, etc. for unperturbed data samples) multiplied by a number of perturbed samples that provided an expected, consistent output. |
| Data Drift | Visualization of injected noise versus a metric. | Quantify noise based on information theoretic underpinnings and add to test data. |
| Regression Test | Show the stability of a training algorithm provided the same data and initial conditions. | Determine a percentage of change in a metric with a model that is retrained with the same training data and is evaluated with the same test data. |

FIG. 6 illustrates examples of a graphical user interface to invoke one or more of ML tests. As shown, a user may select one or more datasets 601 to be used in the testing. The one or more training sets may include perturbed (e.g., synthetically generated) data and unchanged data. In some examples, the selection may be providing a path to the one or more datasets.

A user may select one or more models 603 to be used in the testing. In some examples, the selection may be providing a path to the one or more models.

A user may select one or more tests 605 to be used.

Figure 7:
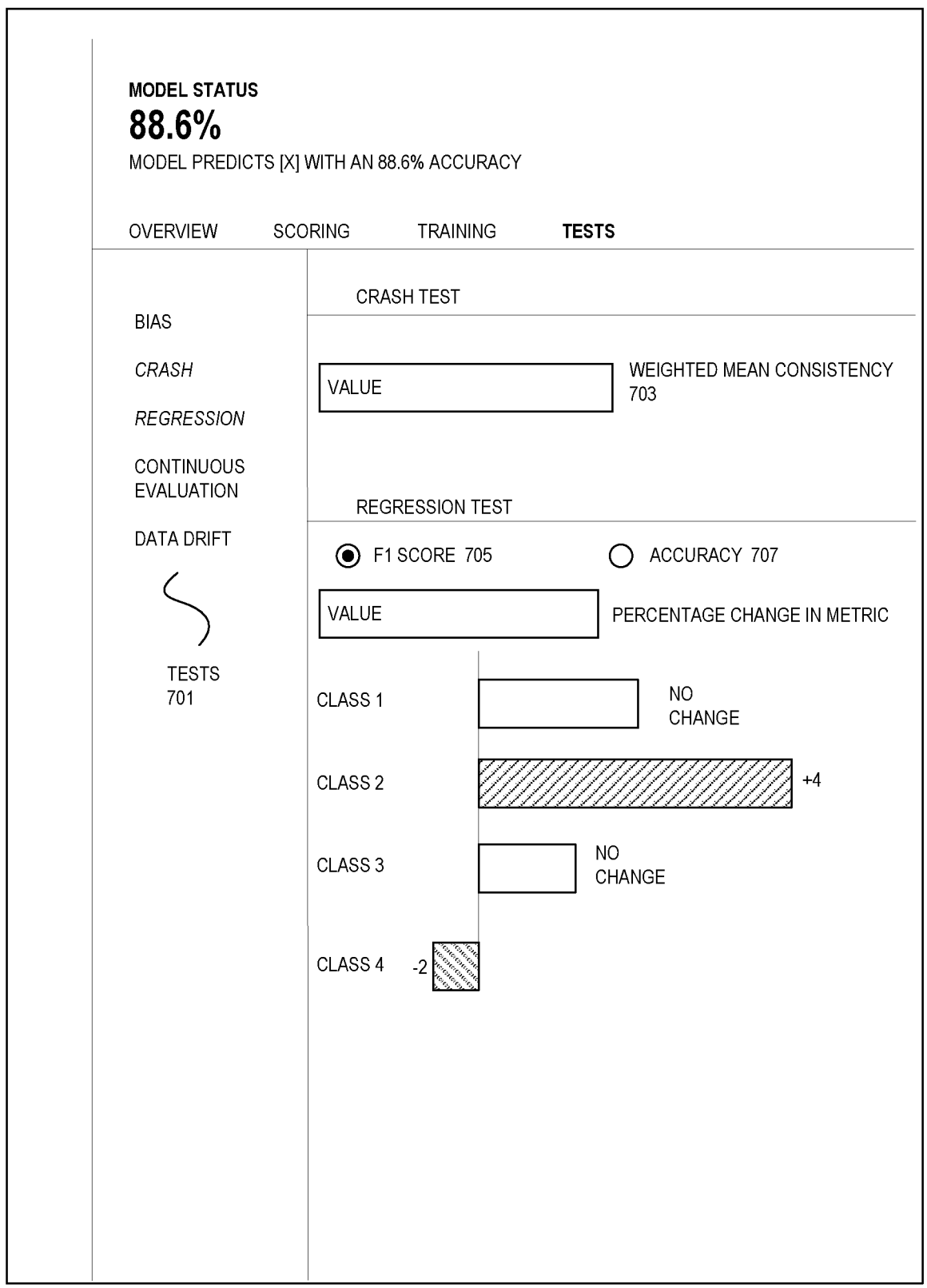
FIG. 7 illustrates examples of a graphical user interface for a crash test and/or regression test.

FIG. 7 illustrates examples of a graphical user interface for a crash test and/or regression test. As shown, in some examples, a user may use a GUI to select one or more tests 701 to view (here CRASH and REGRESSION) are being viewed. The crash test result provides a WMC value 703. The regression test may provide an F1 score 705, an accuracy score 707, and/or a graphical representation of changes of classes.

Figure 8:
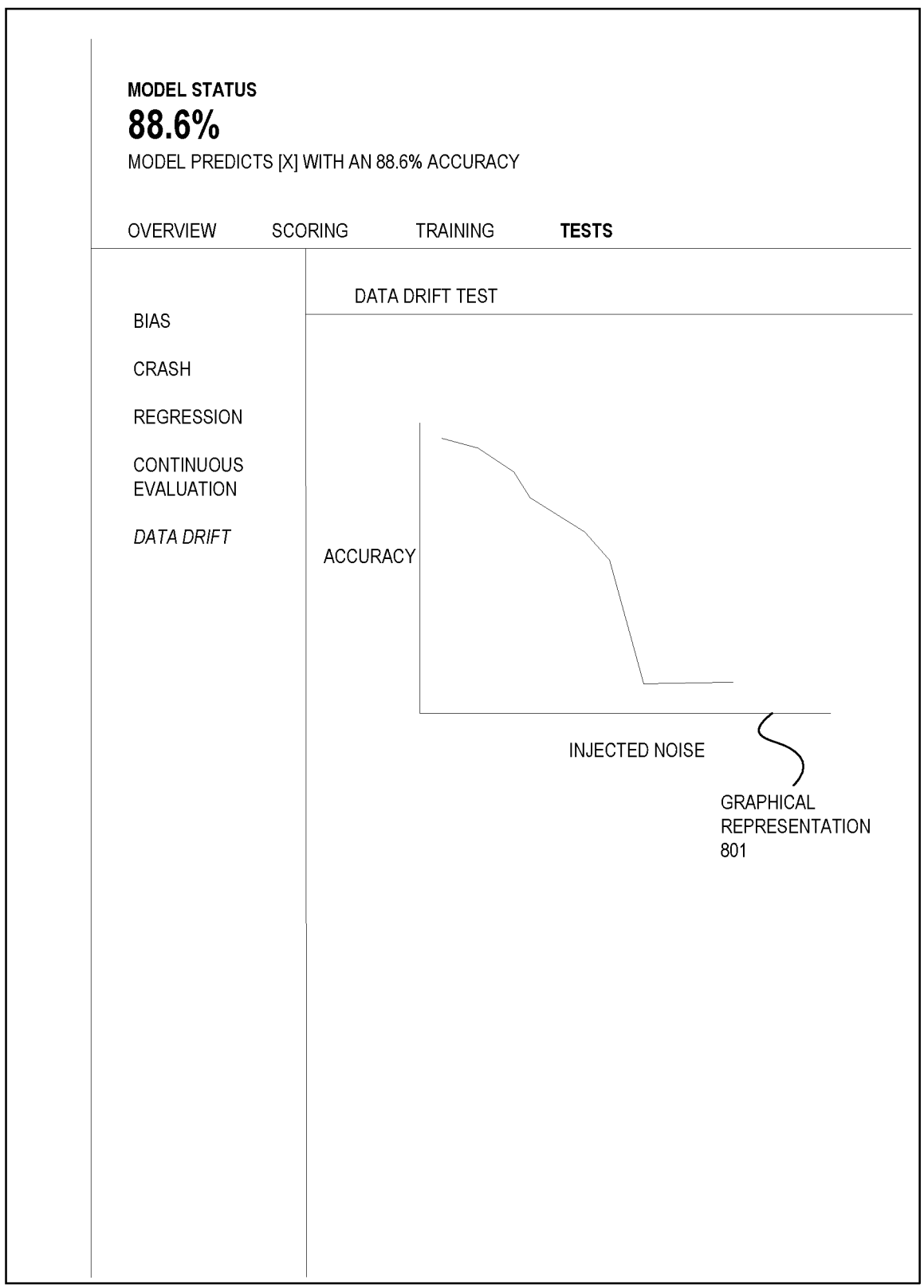
FIG. 8 illustrates examples of a graphical user interface for a data drift test.

FIG. 8 illustrates examples of a graphical user interface for a data drift test. In this illustration, a graphical representation 801 of a plot of accuracy versus injected noise is shown.

Figure 9:
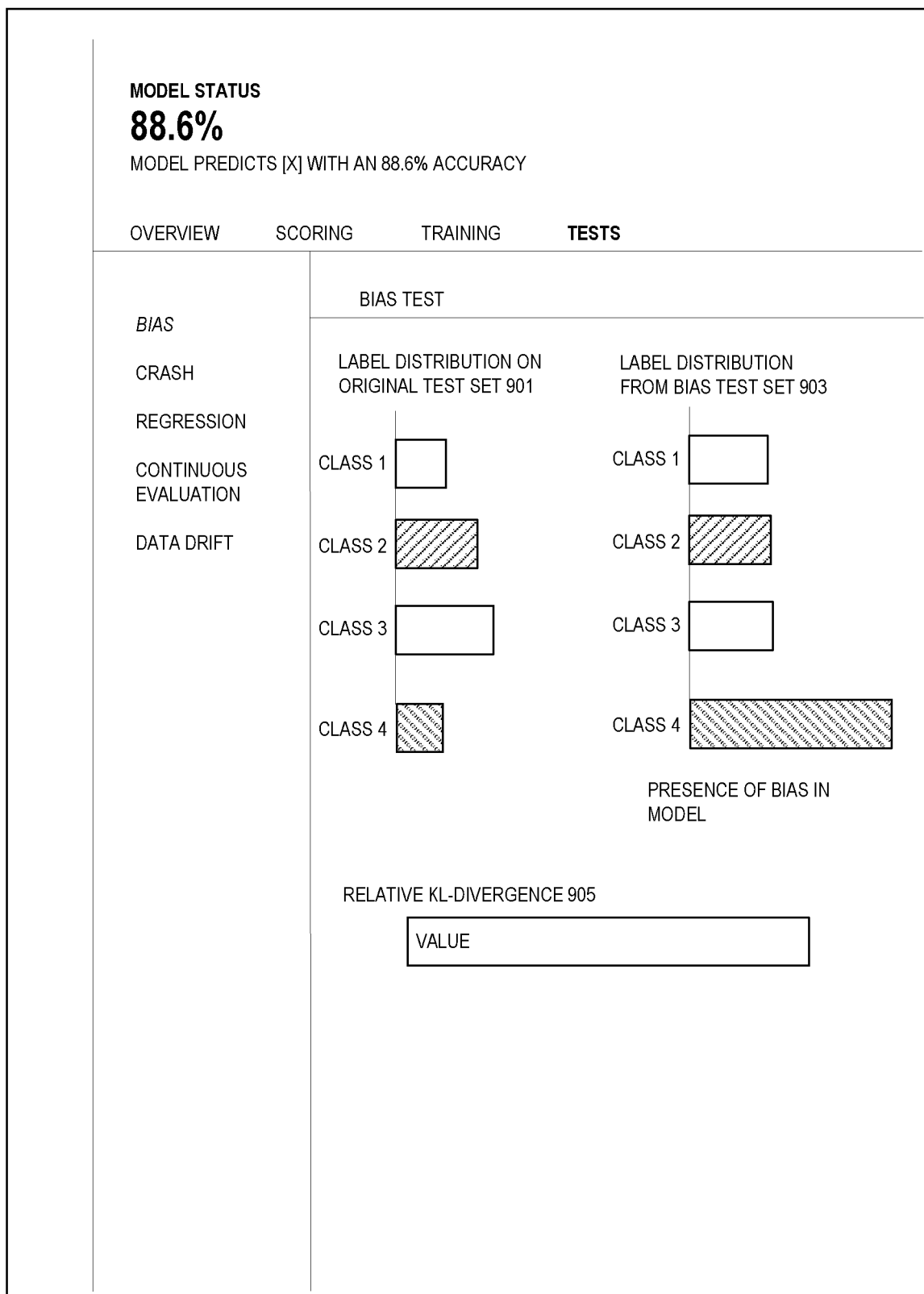
FIG. 9 illustrates examples of a graphical user interface for a bias test.

FIG. 9 illustrates examples of a graphical user interface for a bias test. In this illustration, a label distribution per class on the original test dataset 901 and a label distribution per class on a biased test dataset 903 are shown. There is an annotation noting bias in the model (see class 4). In some examples, a relative KL-divergence value 905 is also provided.

Figure 10:
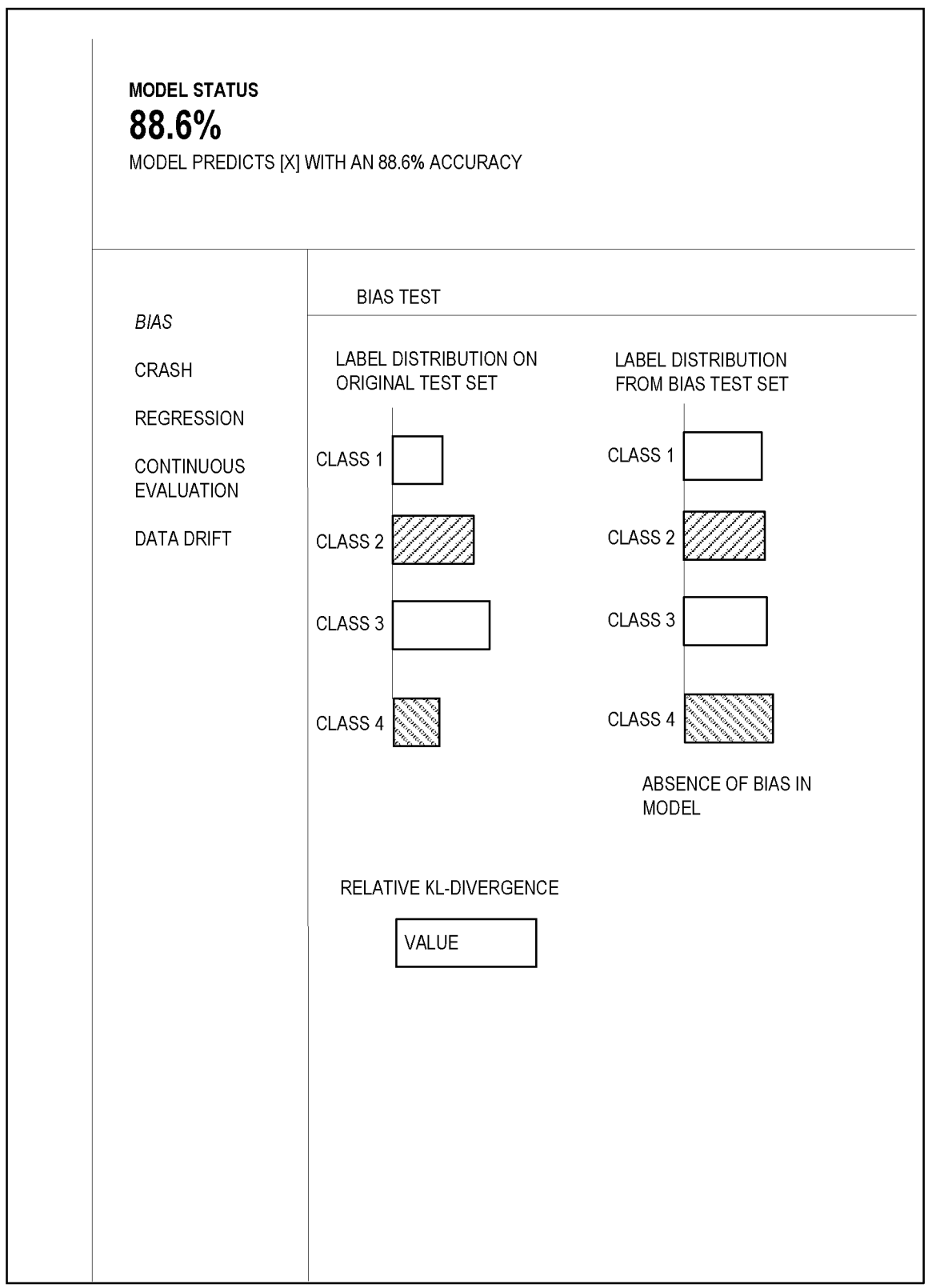
FIG. 10 illustrates examples of a graphical user interface for a bias test.

FIG. 10 illustrates examples of a graphical user interface for a bias test. In this illustration, there is no perceived bias in the model.

Figure 11:
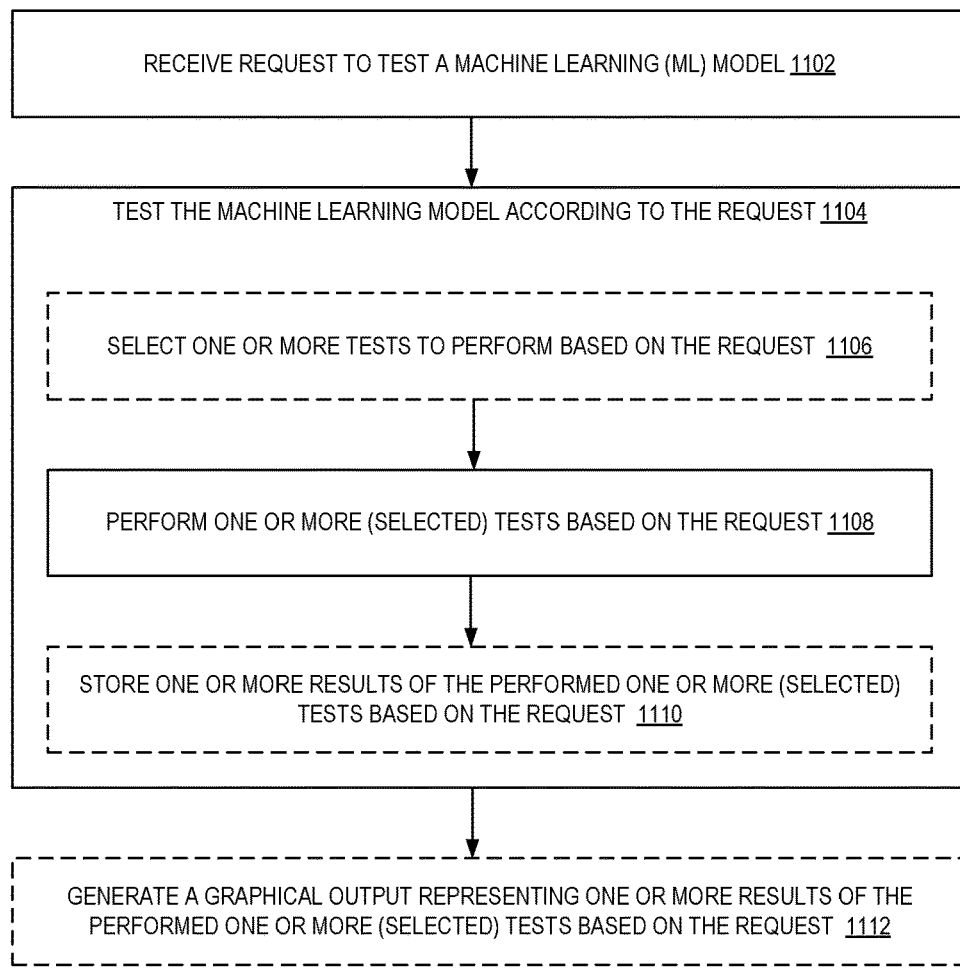
FIG. 11 is a flow diagram illustrating operations of a method for at least testing a ML model according to some examples.

FIG. 11 is a flow diagram illustrating operations of a method for at least testing a ML model according to some examples. Some or all of the operations (or other processes described herein, or variations, and/or combinations thereof)

are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the model testing service 112 of the other figures.

A request to test a machine learning (ML) model is received at 1102. The request may include one or more of: an indication of a location of at least one testing dataset (may include perturbed data), at least one testing dataset (may include perturbed data), an indication of one or more models to test, an indication of one or more tests to perform, etc. In some examples, the request is received via a GUI. In some examples, the request comprises one or more application programming interface (API) calls.

The machine learning model is tested according to the request at 1104. The testing may have several acts. In some examples, one or more tests to perform are selected based on the request at 1106. In other examples, all tests are performed, and no selection is performed.

One or more (selected) tests are performed based on the request at 1108. The one or more tests utilize datasets (perturbed or not) as required by the test as detailed above. In some examples, one or more results of the performed one or more (selected) tests are stored based on the request at 1110.

A graphical output representing one or more results of the performed one or more (selected) tests based on the request is generated at 1112. Examples of GUIs for test results have been previously detailed.

Figure 12:
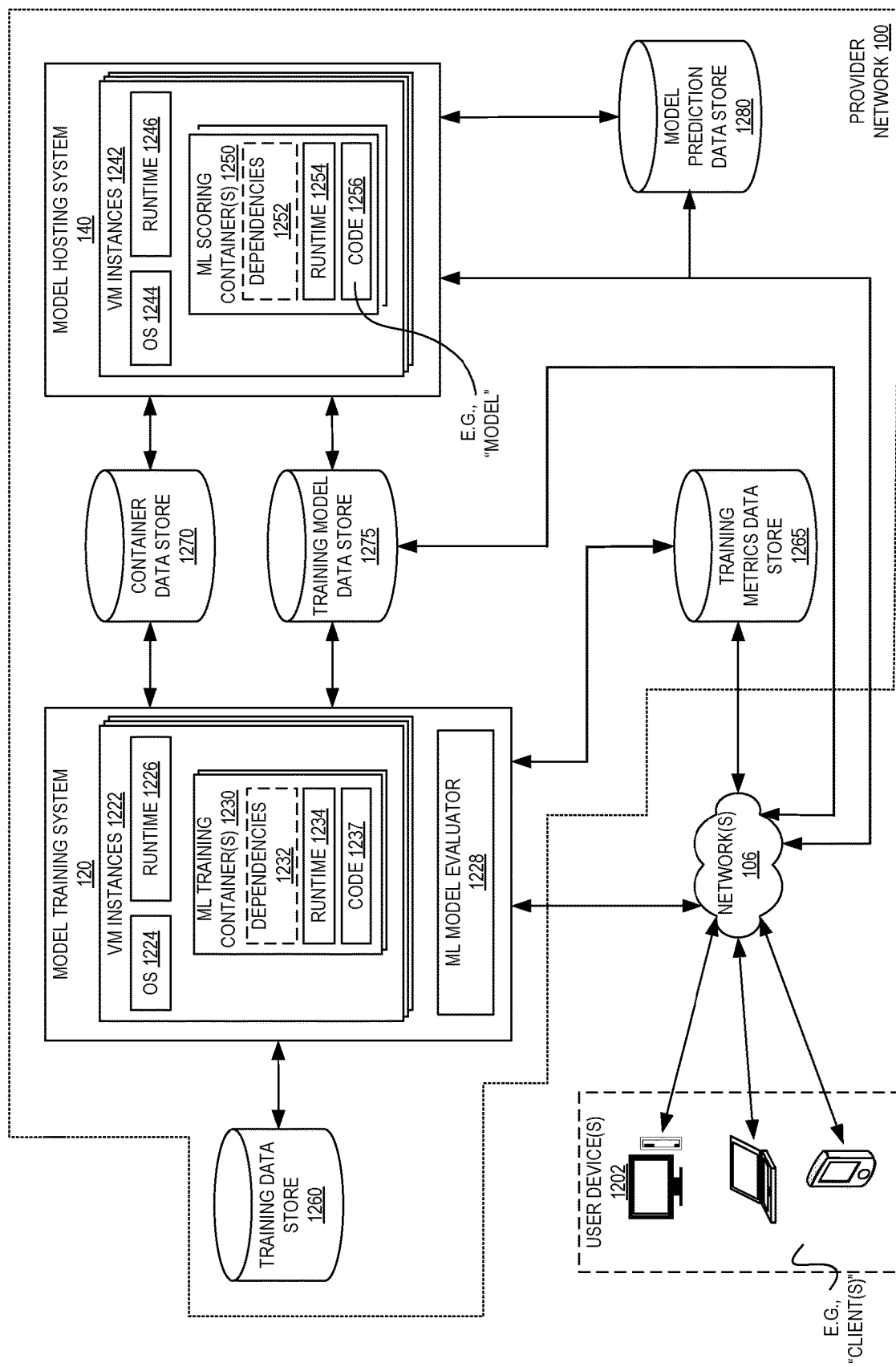
FIG. 12 is a block diagram of an illustrative operating environment in which machine learning models are trained and hosted according to some embodiments.

FIG. 12 is a block diagram of an illustrative operating environment in which machine learning models are trained and hosted according to some embodiments. The operating environment includes end user devices 1202 (for example, computing devices(s), edge device(s)), a model training system, a model hosting system, a training data store 1260, a training metrics data store 1265, a container data store 1270, a training model data store 1275, and a model prediction data store 1280.

A machine learning service described herein may include one or more of these entities, such as the model hosting system 140, model training system 120, and so forth.

In some embodiments, users, by way of user devices 1202, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 1202 and the model training system 120 (or provider network 100), and/or between components of the model training system 120 (or provider network 100), can use HTTP messages to transfer data in a machine-readable file format, such as extensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 1202 can interact with the model training system 120 via frontend 1229 of the model training system 120. For example, a user device 1202 can provide a training request to the frontend 1229 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 1202, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 1202 may provide, in the training request, an algorithm written in any programming language. The model training system 120 then packages the algorithm into a container (optionally with other code, such as a "base" ML algorithm supplemented with user-provided code) that is eventually loaded into a virtual machine instance 1222 for training a machine learning model, as described in greater detail below. For example, a user, via a user device 1202, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 1202 provides, in the training request, an indicator of a container image (for example, an indication of an address or a location at which a container image is stored). For example, the container image can be stored in a container data store 1270, and this container image may have been previously created/uploaded by the user. The model training system 120 can retrieve the container image from the indicated location and create a container using the retrieved container image. The container is then loaded into a virtual machine instance 1222 for training a machine learning model, as described in greater detail below.

The model training system 120 can use the information provided by the user device 1202 to train a machine learning model in one or more pre-established virtual machine instances 1222 in some embodiments. In particular, the model training system 120 includes a single physical computing device or multiple physical computing devices that are interconnected using one or more computing networks (not shown), where the physical computing device(s) host one or more virtual machine instances 1222. The model training system 120 can handle the acquisition and configuration of compute capacity (for example, containers, instances, etc., which are described in greater detail below) based on the information describing the computing machine on which to train a machine learning model provided by the user device 1202. The model training system 120 can then train machine learning models using the compute capacity, as is described in greater detail below. The model training system 120 can automatically scale up and down based on the volume of training requests received from user devices 1202 via frontend 1229, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 1222 are used to execute tasks. For example, such tasks can include training a machine learning model. As shown in FIG. 12, each virtual machine instance 1222 includes an operating system (OS) 1224, a language runtime 1226, and one or more ML training containers 1230. Generally, the ML training containers 1230 are logical units created within a virtual machine instance using the resources available on that instance and can be used to isolate execution of a task from other processes (for example, task executions) occurring in the instance. In some embodiments, the ML training containers 1230 are formed from one or more container images and a top container layer. Each container image may further include one or more image layers, where each image layer represents an executable instruction. As described above, some or all of the executable instructions together represent an algorithm that defines a machine learning model. Changes made to the ML training containers 1230 (for example, creation of new files, modification of existing files, deletion of files, etc.) are stored in the top container layer. If a ML training container 1230 is deleted, the top container layer is also deleted. However, the container image(s) that form a portion of the deleted ML training container 1230 can remain unchanged. The ML training containers 1230 can be implemented, for example, as Linux containers (LXC), Docker containers, and the like.

The ML training containers 1230 may include individual a runtime 1234, code 1237, and dependencies 1232 needed by the code 1237 in some embodiments. The runtime 1234 can be defined by one or more executable instructions that form at least a portion of a container image that is used to form the ML training container 1230 (for example, the executable instruction(s) in the container image that define the operating system and/or runtime to run in the container formed from the container image). The code 1237 includes one or more executable instructions that form at least a portion of a container image that is used to form the ML training container 1230. For example, the code 1237 includes the executable instructions in the container image that represent an algorithm that defines a machine learning model, which may reference (or use) code or libraries from dependencies 1232. The runtime 1234 is configured to execute the code 1237 in response to an instruction to begin machine learning model training. Execution of the code 1237 results in the generation of model data, as described in greater detail below.

In some embodiments, the code 1237 includes executable instructions that represent algorithms that define different machine learning models. For example, the code 1237 includes one set of executable instructions that represent a first algorithm that defines a first machine learning model and a second set of executable instructions that represent a second algorithm that defines a second machine learning model. In some embodiments, the virtual machine instance 1222 executes the code 1237 and trains all of the machine learning models. In some embodiments, the virtual machine instance 1222 executes the code 1237, selecting one of the machine learning models to train. For example, the virtual machine instance 1222 can identify a type of training data indicated by the training request and select a machine learning model to train (for example, execute the executable instructions that represent an algorithm that defines the selected machine learning model) that corresponds with the identified type of training data.

In some embodiments, the runtime 1234 is the same as the runtime 1226 used by the virtual machine instance 1222. In some embodiments, the runtime 1234 is different than the runtime 1226 used by the virtual machine instance 1222.

In some embodiments, the model training system 120 uses one or more container images included in a training request (or a container image retrieved from the container data store 1270 in response to a received training request) to create and initialize a ML training container 1230 in a virtual machine instance 1222. For example, the model training system 120 creates a ML training container 1230 that includes the container image(s) and/or a top container layer.

Prior to beginning the training process, in some embodiments, the model training system 120 retrieves training data from the location indicated in the training request. For example, the location indicated in the training request can be a location in the training data store 1260. Thus, the model training system 120 retrieves the training data from the indicated location in the training data store 1260. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 1222 training the machine learning model. Once the virtual machine instance 1222 has applied and used the retrieved portion or once the virtual machine instance 1222 is about to use all of the retrieved portion (for example, a buffer storing the retrieved portion is nearly empty), then the model training system 120 can retrieve a second portion of the training data and provide the second retrieved portion to the virtual machine instance 1222, and so on.

To perform the machine learning model training, the virtual machine instance 1222 executes code 1237 stored in the ML training container 1230 in some embodiments. For example, the code 1237 includes some or all of the executable instructions that form the container image of the ML training container 1230 initialized therein. Thus, the virtual machine instance 1222 executes some or all of the executable instructions that form the container image of the ML training container 1230 initialized therein to train a machine learning model. The virtual machine instance 1222 executes some or all of the executable instructions according to the hyperparameter values included in the training request. As an illustrative example, the virtual machine instance 1222 trains a machine learning model by identifying values for certain parameters (for example, coefficients, weights, centroids, etc.). The identified values depend on hyperparameters that define how the training is performed. Thus, the virtual machine instance 1222 can execute the executable instructions to initiate a machine learning model training process, where the training process is run using the hyperparameter values included in the training request. Execution of the executable instructions can include the virtual machine instance 1222 applying the training data retrieved by the model training system 120 as input parameters to some or all of the instructions being executed.

In some embodiments, executing the executable instructions causes the virtual machine instance 1222 (for example, the ML training container 1230) to generate model data. For example, the ML training container 1230 generates model data and stores the model data in a file system of the ML training container 1230. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 1230 such that the model data is written to the top container layer of the ML training container 1230 and/or the container image(s) that forms a portion of the ML training container 1230 is modified to include the model data.

The virtual machine instance 1222 (or the model training system 120 itself) pulls the generated model data from the ML training container 1230 and stores the generated model data in the training model data store 1275 in an entry associated with the virtual machine instance 1222 and/or the machine learning model being trained. In some embodiments, the virtual machine instance 1222 generates a single file that includes model data and stores the single file in the training model data store 1275. In some embodiments, the virtual machine instance 1222 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 1222 can package the multiple files into a single file once training is complete and store the single file in the training model data store 1275. Alternatively, the virtual machine instance 1222 stores the multiple files in the training model data store 1275. The virtual machine instance 1222 stores the file(s) in the training model data store 1275 while the training process is ongoing and/or after the training process is complete.

In some embodiments, the virtual machine instance 1222 regularly stores model data file(s) in the training model data store 1275 as the training process is ongoing. Thus, model data file(s) can be stored in the training model data store 1275 at different times during the training process. Each set of model data files corresponding to a particular time or each set of model data files present in the training model data store 1275 as of a particular time could be checkpoints that represent different versions of a partially-trained machine learning model during different stages of the training process. Accordingly, before training is complete, a user, via the user device 1202 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 1275.

In some embodiments, a virtual machine instance 1222 executes code 1237 stored in a plurality of ML training containers 1230. For example, the algorithm included in the container image can be in a format that allows for the parallelization of the training process. Thus, the model training system 120 can create multiple copies of the container image provided in a training request and cause the virtual machine instance 1222 to load each container image copy in a separate ML training container 1230. The virtual machine instance 1222 can then execute, in parallel, the code 1237 stored in the ML training containers 1230. The virtual machine instance 1222 can further provide configuration information to each ML training container 1230 (for example, information indicating that N ML training containers 1230 are collectively training a machine learning model and that a particular ML training container 1230 receiving the configuration information is ML training container 1230 number X of N), which can be included in the resulting model data. By parallelizing the training process, the model training system 120 can significantly reduce the training time in some embodiments.

In some embodiments, a plurality of virtual machine instances 1222 execute code 1237 stored in a plurality of ML training containers 1230. For example, the resources used to train a particular machine learning model can exceed the limitations of a single virtual machine instance 1222. However, the algorithm included in the container image can be in a format that allows for the parallelization of the training process. Thus, the model training system 120 can create multiple copies of the container image provided in a training request, initialize multiple virtual machine instances 1222, and cause each virtual machine instance 1222 to load a container image copy in one or more separate ML training containers 1230. The virtual machine instances 1222 can then each execute the code 1237 stored in the ML training containers 1230 in parallel. The model training system 120 can further provide configuration information to each ML training container 1230 via the virtual machine instances 1222 (for example, information indicating that N ML training containers 1230 are collectively training a machine learning model and that a particular ML training container 1230 receiving the configuration information is ML training container 1230 number X of N, information indicating that M virtual machine instances 1222 are collectively training a machine learning model and that a particular ML training container 1230 receiving the configuration information is initialized in virtual machine instance 1222 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 1222 that execute the code 1237. Thus, the parallelization can occur over different physical computing devices in addition to over different virtual machine instances 1222 and/or ML training containers 1230.

In some embodiments, the model training system 120 includes a ML model evaluator 1228. In some examples, this ML model evaluator 1228 includes the synthetic data service 102. The ML model evaluator 1228 can monitor virtual machine instances 1222 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 1228 can obtain the model data for a machine learning model being trained and evaluation data from the training data store 1260. The evaluation data is separate from the data used to train a machine learning model and includes both input data and expected outputs (for example, known results), and thus the ML model evaluator 1228 can define a machine learning model using the model data and execute the machine learning model by providing the input data as inputs to the machine learning model. The ML model evaluator 1228 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 1228 periodically generates model metrics during the training process and stores the model metrics in the training metrics data store 1265 in some embodiments. While the machine learning model is being trained, a user, via the user device 1202, can access and retrieve the model metrics from the training metrics data store 1265. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 1202, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 1222 to optionally delete an existing ML training container 1230, create and initialize a new ML training container 1230 using some or all of the information included in the request, and execute the code 1237 stored in the new ML training container 1230 to restart the machine learning model training process. As another example, the model training system 120 can cause the virtual machine instance 1222 to modify the execution of code stored in an existing ML training container 1230 according to the data provided in the modification request. In some embodiments, the user, via the user device 1202, can transmit a request to the model training system 120 to stop the machine learning model training process. The model training system 120 can then instruct the virtual machine instance 1222 to delete the ML training container 1230 and/or to delete any model data stored in the training model data store 1275.

As described below, in some embodiments, the model data stored in the training model data store 1275 is used by the model hosting system 140 to deploy machine learning models. Alternatively or additionally, a user device 1202 or another computing device (not shown) can retrieve the model data from the training model data store 1275 to implement a learning algorithm in an external device. As an illustrative example, a robotic device can include sensors to capture input data. A user device 1202 can retrieve the model data from the training model data store 1275 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 1222 are shown in FIG. 12 as a single grouping of virtual machine instances 1222, some embodiments of the present application separate virtual machine instances 1222 that are actively assigned to execute tasks from those virtual machine instances 1222 that are not actively assigned to execute tasks. For example, those virtual machine instances 1222 actively assigned to execute tasks are grouped into an "active pool," while those virtual machine instances 1222 not actively assigned to execute tasks are placed within a "warming pool." In some embodiments, those virtual machine instances 1222 within the warming pool can be pre-initialized with an operating system, language runtimes, and/or other software required to enable rapid execution of tasks (for example, rapid initialization of machine learning model training in ML training container(s) 1230) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 1202, the model hosting system 140, etc.). The processing unit can also communicate to and from a memory of a virtual machine instance 1222 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 1242. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 1202 via frontend 1249 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 1242 are used to execute tasks. For example, such tasks can include executing a machine learning model. As shown in FIG. 12, each virtual machine instance 1242 includes an operating system (OS) 1244, a language runtime 1246, and one or more ML scoring containers 1250. The ML scoring containers 1250 are similar to the ML training containers 1230 in that the ML scoring containers 1250 are logical units created within a virtual machine instance using the resources available on that instance and can be used to isolate execution of a task from other processes (for example, task executions) occurring in the instance. In some embodiments, the ML scoring containers 1250 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 1250 (for example, creation of new files, modification of existing files, deletion of files, etc.) are stored in the top container layer. If a ML scoring container 1250 is deleted, the top container layer is also deleted. However, the container image(s) that form a portion of the deleted ML scoring container 1250 can remain unchanged. The ML scoring containers 1250 can be implemented, for example, as Linux containers.

The ML scoring containers 1250 each include a runtime 1254, code 1256, and dependencies 1252 (for example, supporting software such as libraries) needed by the code 1256 in some embodiments. The runtime 1254 can be defined by one or more executable instructions that form at least a portion of a container image that is used to form the ML scoring container 1250 (for example, the executable instruction(s) in the container image that define the operating system and/or runtime to run in the container formed from the container image). The code 1256 includes one or more executable instructions that form at least a portion of a container image that is used to form the ML scoring container 1250. For example, the code 1256 includes the executable instructions in the container image that represent an algorithm that defines a machine learning model, which may reference dependencies 1252. The code 1256 can also include model data that represent characteristics of the defined machine learning model, as described in greater detail below. The runtime 1254 is configured to execute the code 1256 in response to an instruction to begin execution of a machine learning model. Execution of the code 1256 results in the generation of outputs (for example, predicted results), as described in greater detail below.

In some embodiments, the runtime 1254 is the same as the runtime 1246 used by the virtual machine instance 1242. In some embodiments, runtime 1254 is different than the runtime 1246 used by the virtual machine instance 1242.

In some embodiments, the model hosting system 140 uses one or more container images included in a deployment request (or a container image retrieved from the container data store 1270 in response to a received deployment request) to create and initialize a ML scoring container 1250 in a virtual machine instance 1242. For example, the model hosting system 140 creates a ML scoring container 1250 that includes the container image(s) and/or a top container layer.

As described above, a user device 1202 can submit a deployment request and/or an execution request to the model hosting system 140 via the frontend 1249 in some embodiments. A deployment request causes the model hosting system 140 to deploy a trained machine learning model into a virtual machine instance 1242. For example, the deployment request can include an identification of an endpoint (for example, an endpoint name, such as an HTTP endpoint name) and an identification of one or more trained machine learning models (for example, a location of one or more model data files stored in the training model data store 1275). Optionally, the deployment request also includes an identification of one or more container images stored in the container data store 1270.

Upon receiving the deployment request, the model hosting system 140 initializes ones or more ML scoring containers 1250 in one or more hosted virtual machine instance 1242. In embodiments in which the deployment request includes an identification of one or more container images, the model hosting system 140 forms the ML scoring container(s) 1250 from the identified container image(s). For example, a container image identified in a deployment request can be the same container image used to form an ML training container 1230 used to train the machine learning model corresponding to the deployment request. Thus, the code 1256 of the ML scoring container(s) 1250 includes one or more executable instructions in the container image(s) that represent an algorithm that defines a machine learning model. In embodiments in which the deployment request does not include an identification of a container image, the model hosting system 140 forms the ML scoring container(s) 1250 from one or more container images stored in the container data store 1270 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 1250 by retrieving model data corresponding to the identified trained machine learning model(s) in some embodiments. For example, the deployment request can identify a location of model data file(s) stored in the training model data store 1275. In embodiments in which a single model data file is identified in the deployment request, the model hosting system 140 retrieves the identified model data file from the training model data store 1275 and inserts the model data file into a single ML scoring container 1250, which forms a portion of code 1256. In some embodiments, the model data file is archived or compressed (for example, formed from a package of individual files). Thus, the model hosting system 140 unarchives or decompresses the model data file to obtain multiple individual files and inserts the individual files into the ML scoring container 1250. In some embodiments, the model hosting system 140 stores the model data file in the same location as the location in which the model data file was stored in the ML training container 1230 that generated the model data file. For example, the model data file initially was stored in the top container layer of the ML training container 1230 at a certain offset, and the model hosting system 140 then stores the model data file in the top container layer of the ML scoring container 1250 at the same offset.

In embodiments in which multiple model data files are identified in the deployment request, the model hosting system 140 retrieves the identified model data files from the training model data store 1275. The model hosting system 140 can insert the model data files into the same ML scoring container 1250, into different ML scoring containers 1250 initialized in the same virtual machine instance 1242, or into different ML scoring containers 1250 initialized in different virtual machine instances 1242. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 1250 with the endpoint identified in the deployment request. For example, each of the initialized ML scoring container(s) 1250 can be associated with a network address. The model hosting system 140 can map the network address(es) to the identified endpoint, and the model hosting system 140 or another system (for example, a routing system, not shown) can store the mapping. Thus, a user device 1202 can refer to trained machine learning model(s) stored in the ML scoring container(s) 1250 using the endpoint. This allows for the network address of an ML scoring container 1250 to change without causing the user operating the user device 1202 to change the way in which the user refers to a trained machine learning model.

Once the ML scoring container(s) 1250 are initialized, the ML scoring container(s) 1250 are ready to execute trained machine learning model(s). In some embodiments, the user device 1202 transmits an execution request to the model hosting system 140 via the frontend 1249, where the execution request identifies an endpoint and includes an input to a machine learning model (for example, a set of input data). The model hosting system 140 or another system (for example, a routing system, not shown) can obtain the execution request, identify the ML scoring container(s) 1250 corresponding to the identified endpoint, and route the input to the identified ML scoring container(s) 1250.

In some embodiments, a virtual machine instance 1242 executes the code 1256 stored in an identified ML scoring container 1250 in response to the model hosting system 140 receiving the execution request. In particular, execution of the code 1256 causes the executable instructions in the code 1256 corresponding to the algorithm to read the model data file stored in the ML scoring container 1250, use the input included in the execution request as an input parameter, and generate a corresponding output. As an illustrative example, the algorithm can include coefficients, weights, layers, cluster centroids, and/or the like. The executable instructions in the code 1256 corresponding to the algorithm can read the model data file to determine values for the coefficients, weights, layers, cluster centroids, and/or the like. The executable instructions can include input parameters, and the input included in the execution request can be supplied by the virtual machine instance 1242 as the input parameters. With the machine learning model characteristics and the input parameters provided, execution of the executable instructions by the virtual machine instance 1242 can be completed, resulting in an output.

In some embodiments, the virtual machine instance 1242 stores the output in the model prediction data store 1280. Alternatively or in addition, the virtual machine instance 1242 transmits the output to the user device 1202 that submitted the execution result via the frontend 1249.

In some embodiments, the execution request corresponds to a group of related trained machine learning models. Thus, the ML scoring container 1250 can transmit the output to a second ML scoring container 1250 initialized in the same virtual machine instance 1242 or in a different virtual machine instance 1242. The virtual machine instance 1242 that initialized the second ML scoring container 1250 can then execute second code 1256 stored in the second ML scoring container 1250, providing the received output as an input parameter to the executable instructions in the second code 1256. The second ML scoring container 1250 further includes a model data file stored therein, which is read by the executable instructions in the second code 1256 to determine values for the characteristics defining the machine learning model. Execution of the second code 1256 results in a second output. The virtual machine instance 1242 that initialized the second ML scoring container 1250 can then transmit the second output to the model prediction data store 1280 and/or the user device 1202 via the frontend 1249 (for example, if no more trained machine learning models are needed to generate an output) or transmit the second output to a third ML scoring container 1250 initialized in the same or different virtual machine instance 1242 (for example, if outputs from one or more additional trained machine learning models are needed), and the above-referenced process can be repeated with respect to the third ML scoring container 1250.

While the virtual machine instances 1242 are shown in FIG. 12 as a single grouping of virtual machine instances 1242, some embodiments of the present application separate virtual machine instances 1242 that are actively assigned to execute tasks from those virtual machine instances 1242 that are not actively assigned to execute tasks. For example, those virtual machine instances 1242 actively assigned to execute tasks are grouped into an "active pool," while those virtual machine instances 1242 not actively assigned to execute tasks are placed within a "warming pool." In some embodiments, those virtual machine instances 1242 within the warming pool can be pre-initialized with an operating system, language runtimes, and/or other software required to enable rapid execution of tasks (for example, rapid initialization of ML scoring container(s) 1250, rapid execution of code 1256 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 1202, the model training system 120, etc.). The processing unit can also communicate to and from a memory of a virtual machine instance 1242 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 12 are not meant to be limiting. For example, the model training system 120 and/or the model hosting system 140 could also operate within a computing environment having a fewer or greater number of devices than are illustrated in FIG. 12. Thus, the depiction of the model training system 120 and/or the model hosting system 140 in FIG. 12 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 1229 processes all training requests received from user devices 1202 and provisions virtual machine instances 1222. In some embodiments, the frontend 1229 serves as a front door to all the other services provided by the model training system 120. The frontend 1229 processes the requests and makes sure that the requests are properly authorized. For example, the frontend 1229 may determine whether the user associated with the training request is authorized to initiate the training process.

Similarly, frontend 1249 processes all deployment and execution requests received from user devices 1202 and provisions virtual machine instances 1242. In some embodiments, the frontend 1249 serves as a front door to all the other services provided by the model hosting system 140. The frontend 1249 processes the requests and makes sure that the requests are properly authorized. For example, the frontend 1249 may determine whether the user associated with a deployment request or an execution request is authorized to access the indicated model data and/or to execute the indicated machine learning model.

The training data store 1260 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 1260 is depicted as being located external to the model training system 120 and the model hosting system 140, this is not meant to be limiting. For example, in some embodiments not shown, the training data store 1260 is located internal to at least one of the model training system 120 or the model hosting system 140.

In some embodiments, the training metrics data store 1265 stores model metrics. While the training metrics data store 1265 is depicted as being located external to the model training system 120 and the model hosting system 140, this is not meant to be limiting. For example, in some embodiments not shown, the training metrics data store 1265 is located internal to at least one of the model training system 120 or the model hosting system 140.

The container data store 1270 stores container images, such as container images used to form ML training containers 1230 and/or ML scoring containers 1250, that can be retrieved by various virtual machine instances 1222 and/or 1242. While the container data store 1270 is depicted as being located external to the model training system 120 and the model hosting system 140, this is not meant to be limiting. For example, in some embodiments not shown, the container data store 1270 is located internal to at least one of the model training system 120 and the model hosting system 140.

The training model data store 1275 stores model data files. In some embodiments, some of the model data files are comprised of a single file, while other model data files are packages of multiple individual files. While the training model data store 1275 is depicted as being located external to the model training system 120 and the model hosting system 140, this is not meant to be limiting. For example, in some embodiments not shown, the training model data store 1275 is located internal to at least one of the model training system 120 or the model hosting system 140.

The model prediction data store 1280 stores outputs (for example, execution results) generated by the ML scoring containers 1250 in some embodiments. While the model prediction data store 1280 is depicted as being located external to the model training system 120 and the model hosting system 140, this is not meant to be limiting. For example, in some embodiments not shown, the model prediction data store 1280 is located internal to at least one of the model training system 120 and the model hosting system 140.

While the model training system 120, the model hosting system 140, the training data store 1260, the training metrics data store 1265, the container data store 1270, the training model data store 1275, and the model prediction data store 1280 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 1202 via the one or more network(s) 106.

Various example user devices 1202 are shown in FIG. 12, including a desktop computer, laptop, and a mobile phone, each provided by way of illustration. In general, the user devices 1202 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 1202 with one or more user interfaces, command-line interfaces (CLI), application programing interfaces (API), and/or other programmatic interfaces for submitting training requests, deployment requests, and/or execution requests. In some embodiments, the user devices 1202 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 13:
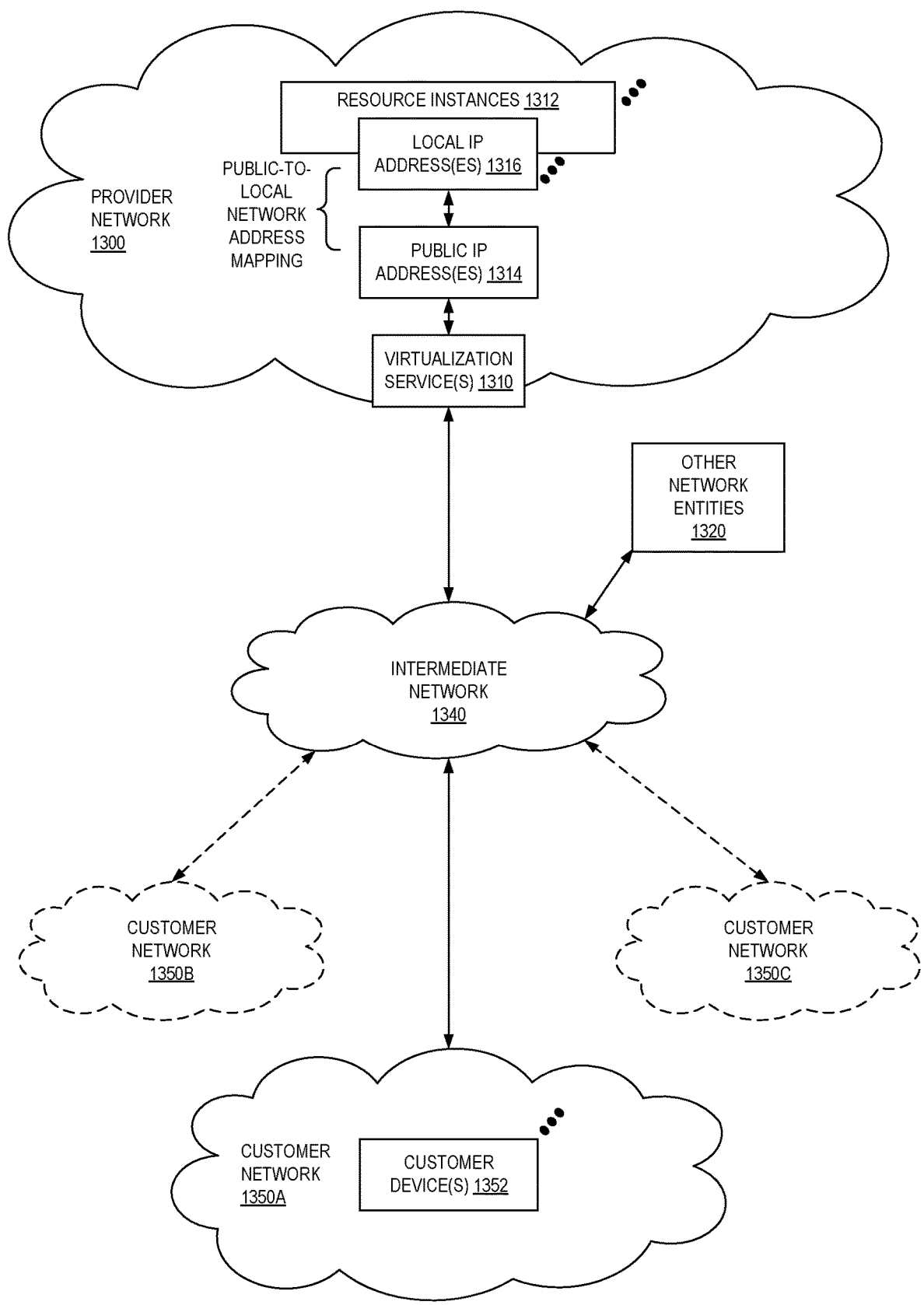
FIG. 13 illustrates an example provider network environment according to some examples.

FIG. 13 illustrates an example provider network (or "service provider system") environment according to some examples. A provider network 1300 can provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 can be associated with the resource instances 1312; the local IP addresses are the internal network addresses of the resource instances 1312 on the provider network 1300. In some examples, the provider network 1300 can also provide public IP addresses 1314 and/or public IP address ranges (e.g., Internet Protocol version 4 (IPv4) or Internet Protocol version 6 (IPv6) addresses) that customers can obtain from the provider 1300.

Conventionally, the provider network 1300, via the virtualization services 1310, can allow a customer of the service provider (e.g., a customer that operates one or more customer networks 1350A-1350C (or "client networks") including one or more customer device(s) 1352) to dynamically associate at least some public IP addresses 1314 assigned or allocated to the customer with particular resource instances 1312 assigned to the customer. The provider network 1300 can also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of the customer network(s) 1350A-1350C can, for example, implement customer-specific applications and present the customer's applications on an intermediate network 1340, such as the Internet. Other network entities 1320 on the intermediate network 1340 can then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 can be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1300; a customer can then assign their allocated public IP addresses to particular resource instances allocated to the customer. These public IP addresses can be referred to as customer public IP addresses, or simply customer IP addresses. Instead of being assigned by the provider network 1300 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
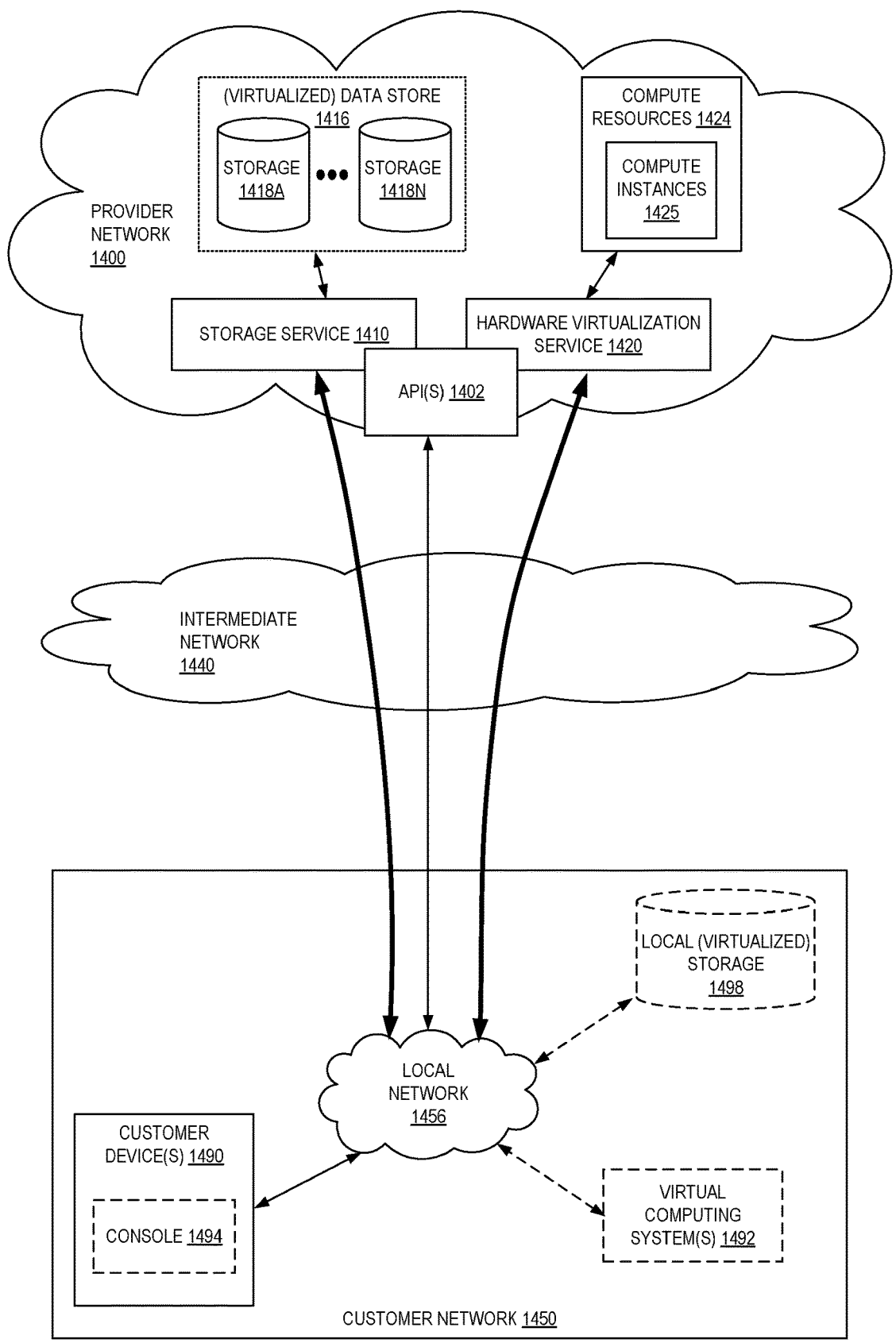
FIG. 14 is a block diagram of an example provider network that provides a storage service and a hardware virtualization service to customers according to some examples.

FIG. 14 is a block diagram of an example provider network environment that provides a storage service and a hardware virtualization service to customers, according to some examples. A hardware virtualization service 1420 provides multiple compute resources 1424 (e.g., compute instances 1425, such as VMs) to customers. The compute resources 1424 can, for example, be provided as a service to customers of a provider network 1400 (e.g., to a customer that implements a customer network 1450). Each computation resource 1424 can be provided with one or more local IP addresses. The provider network 1400 can be configured to route packets from the local IP addresses of the compute resources 1424 to public Internet destinations, and from public Internet sources to the local IP addresses of the compute resources 1424.

The provider network 1400 can provide the customer network 1450, for example coupled to an intermediate network 1440 via a local network 1456, the ability to implement virtual computing systems 1492 via the hardware virtualization service 1420 coupled to the intermediate network 1440 and to the provider network 1400. In some examples, the hardware virtualization service 1420 can provide one or more APIs 1402, for example a web services interface, via which the customer network 1450 can access functionality provided by the hardware virtualization service 1420, for example via a console 1494 (e.g., a web-based application, standalone application, mobile application, etc.) of a customer device 1490. In some examples, at the provider network 1400, each virtual computing system 1492 at the customer network 1450 can correspond to a computation resource 1424 that is leased, rented, or otherwise provided to the customer network 1450.

From an instance of the virtual computing system(s) 1492 and/or another customer device 1490 (e.g., via console 1494), the customer can access the functionality of a storage service 1410, for example via the one or more APIs 1402, to access data from and store data to storage resources 1418A-1418N of a virtual data store 1416 (e.g., a folder or "bucket," a virtualized volume, a database, etc.) provided by the provider network 1400. In some examples, a virtualized data store gateway (not shown) can be provided at the customer network 1450 that can locally cache at least some data, for example frequently accessed or critical data, and that can communicate with the storage service 1410 via one or more communications channels to upload new or modified data from a local cache so that the primary store of data (the virtualized data store 1416) is maintained. In some examples, a user, via the virtual computing system 1492 and/or another customer device 1490, can mount and access virtual data store 1416 volumes via the storage service 1410 acting as a storage virtualization service, and these volumes can appear to the user as local (virtualized) storage 1498.

While not shown in FIG. 14, the virtualization service(s) can also be accessed from resource instances within the provider network 1400 via the API(s) 1402. For example, a customer, appliance service provider, or other entity can access a virtualization service from within a respective virtual network on the provider network 1400 via the API(s) 1402 to request allocation of one or more resource instances within the virtual network or within another virtual network.

Illustrative Systems

Figure 15:
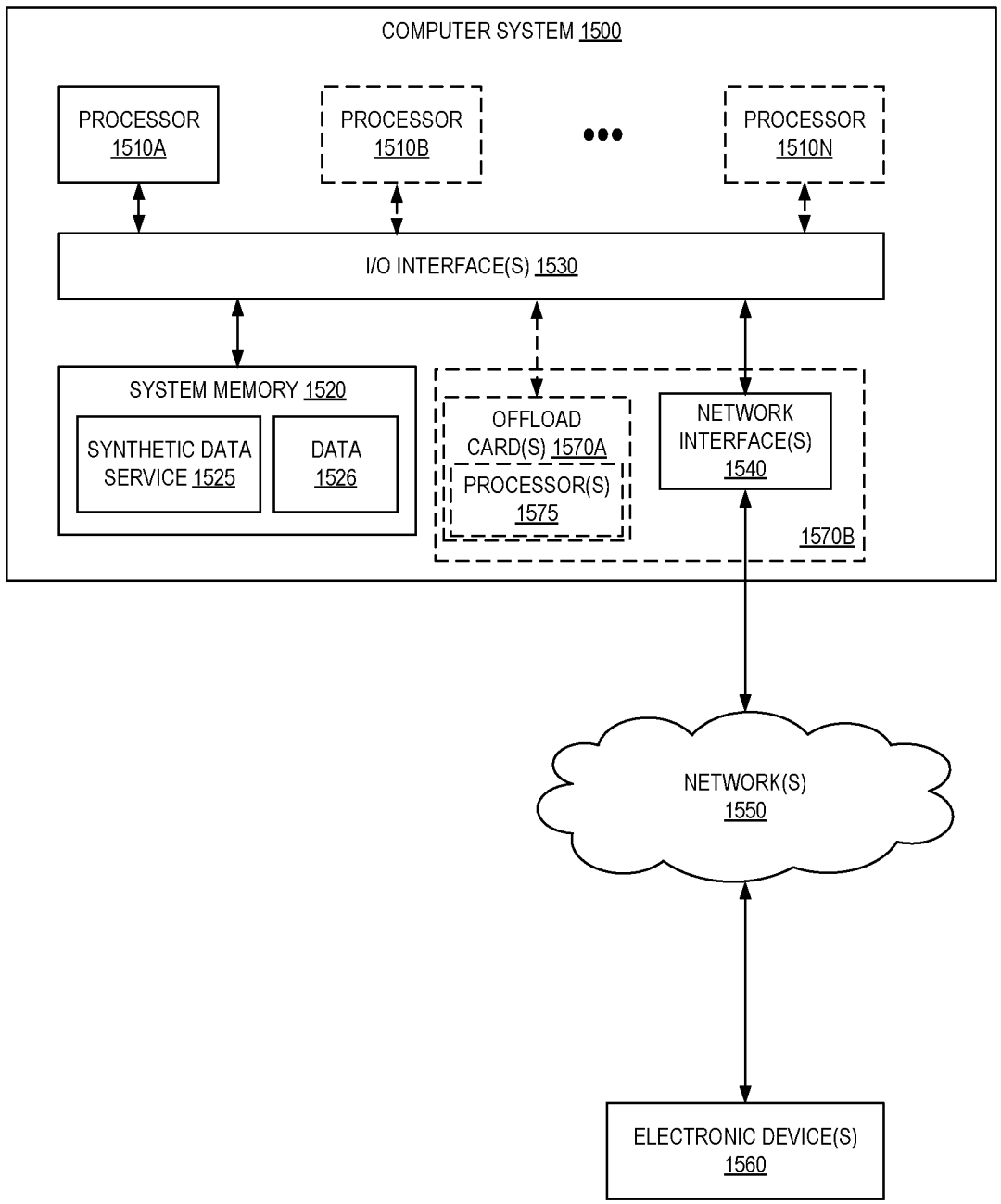
FIG. 15 is a block diagram illustrating an example computer system that can be used in some examples.

In some examples, a system that implements a portion or all of the techniques described herein can include a general-purpose computer system, such as the computer system 1500 (also referred to as a computing device or electronic device) illustrated in FIG. 15, that includes, or is configured to access, one or more computer-accessible media. In the illustrated example, the computer system 1500 includes one or more processors 1510 coupled to a system memory 1520 via an input/output (I/O) interface 1530. The computer system 1500 further includes a network interface 1540 coupled to the I/O interface 1530. While FIG. 15 shows the computer system 1500 as a single computing device, in various examples the computer system 1500 can include one computing device or any number of computing devices configured to work together as a single computer system 1500.

In various examples, the computer system 1500 can be a uniprocessor system including one processor 1510, or a multiprocessor system including several processors 1510 (e.g., two, four, eight, or another suitable number). The processor(s) 1510 can be any suitable processor(s) capable of executing instructions. For example, in various examples, the processor(s) 1510 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1510 can commonly, but not necessarily, implement the same ISA.

The system memory 1520 can store instructions and data accessible by the processor(s) 1510. In various examples, the system memory 1520 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1520 as synthetic data service code 1525 (e.g., executable to implement, in whole or in part, the synthetic data service 102) and data 1526.

In some examples, the I/O interface 1530 can be configured to coordinate I/O traffic between the processor 1510, the system memory 1520, and any peripheral devices in the device, including the network interface 1540 and/or other peripheral interfaces (not shown). In some examples, the I/O interface 1530 can perform any necessary protocol, timing, or other data transformations to convert data signals from one component (e.g., the system memory 1520) into a format suitable for use by another component (e.g., the processor 1510). In some examples, the I/O interface 1530 can include support for devices attached through various types of peripheral buses, such as a variant of the Peripheral Component Interconnect (PCI) bus standard or the Universal Serial Bus (USB) standard, for example. In some examples, the function of the I/O interface 1530 can be split into two or more separate components, such as a north bridge and a south bridge, for example. Also, in some examples, some or all of the functionality of the I/O interface 1530, such as an interface to the system memory 1520, can be incorporated directly into the processor 1510.

The network interface 1540 can be configured to allow data to be exchanged between the computer system 1500 and other devices 1560 attached to a network or networks 1550, such as other computer systems or devices as illustrated in FIG. 1, for example. In various examples, the network interface 1540 can support communication via any suitable wired or wireless general data networks, such as types of Ethernet network, for example. Additionally, the network interface 1540 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1500 includes one or more offload cards 1570A or 1570B (including one or more processors 1575, and possibly including the one or more network interfaces 1540) that are connected using the I/O interface 1530 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 1500 can act as a host electronic device (e.g., operating as part of a hardware virtualization service) that hosts compute resources such as compute instances, and the one or more offload cards 1570A or 1570B execute a virtualization manager that can manage compute instances that execute on the host electronic device. As an example, in some examples the offload card(s) 1570A or 1570B can perform compute instance management operations, such as pausing and/or un-pausing compute instances, launching and/or terminating compute instances, performing memory transfer/copying operations, etc. These management operations can, in some examples, be performed by the offload card(s) 1570A or 1570B in coordination with a hypervisor (e.g., upon a request from a hypervisor) that is executed by the other processors 1510A-1510N of the computer system 1500. However, in some examples the virtualization manager implemented by the offload card(s) 1570A or 1570B can accommodate requests from other entities (e.g., from compute instances themselves), and can not coordinate with (or service) any separate hypervisor.

In some examples, the system memory 1520 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1500 via the I/O interface 1530. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1500 as the system memory 1520 or another type of memory. Further, a computer-accessible medium can include transmission media or signals such as electrical, electromagnetic, or digital signals, conveyed via a communication medium such as a network and/or a wireless link, such as can be implemented via the network interface 1540.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1418A-1418N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving a request to generate synthetic data;
   generating the synthetic data according to the request by:
      selecting one or more transformation modules to be used to generate the synthetic data,
      instantiating the one or more transformation modules, and
      applying the one or more transformation modules in a defined order to at least one dataset to generate the synthetic data;
   storing the synthetic data;

receiving a request to test a machine learning (ML) model using the synthetic data;

testing the ML model according to the request using one or more tests implemented as code executing on one or more processors using the synthetic data, wherein a test of the one or more tests is a bias test to perform at least one of a generation of label distributions where test data is perturbed and not perturbed, or a determination of a relative Kullback-Leibler Divergence as a ratio of distributions between training data and test data with and without injection of increased entropy; and generating a graphical output representing one or more results of the one or more tests.

2. The computer-implemented method of claim 1, wherein the generating of the synthetic data is performed in response to the request that includes one or more of: an indication of a location of the at least one dataset, the at least one dataset, an indication of a location to store the synthetic data, an indication of the one or more transformation modules, an indication to use a random set of the one or more transformation modules, an indication of a goal for the synthetic data, an indication of entropy to use for one or more columns of the at least one dataset, an identifier per column to have an entropy of the column changed, or an indication of the defined order of the one or more transformation modules.

3. The computer-implemented method of claim 1, wherein the one or more tests are one or more of a bias test, a crash test, a continuous evaluation test, or a regression test.

4. A computer-implemented method comprising:
receiving a request to generate synthetic data;
generating the synthetic data according to the request by:
selecting one or more transformation modules to be used to generate the synthetic data,
instantiating the one or more transformation modules, and
applying the one or more transformation modules in a defined order to at least one dataset to generate the synthetic data;
storing the synthetic data;
receiving a request to test a machine learning (ML) model using the synthetic data;
testing the ML model according to the request using one or more tests implemented as code executing on one or more processors, wherein a test of the one or more tests is a test to quantify, as a mean weighted consistency value, a prediction of individual data points when each feature receives an out-of-bounds value; and
generating a graphical output representing one or more results of the one or more tests.

5. The computer-implemented method of claim 4, wherein selecting the one or more transformation modules is a random selection.

6. The computer-implemented method of claim 4, wherein selecting the one or more transformation modules is automatically performed based at least in part on a data perturbation goal.

7. The computer-implemented method of claim 4, wherein selecting the one or more transformation modules is in response to a user selection of one or more particular transformation modules.

8. The computer-implemented method of claim 4, wherein the defined order is provided by the request to generate the synthetic data.

9. The computer-implemented method of claim 4, wherein the defined order is systemically pre-defined.

10. The computer-implemented method of claim 4, wherein the generating of the synthetic data is performed in response to the request that includes one or more of: an indication of a location of the at least one dataset, the at least one dataset, an indication of a location to store the synthetic data, an indication of the one or more transformation modules, an indication to use a random set of one or more transformation modules, an indication of a goal for the synthetic data, an indication of entropy to use for one or more columns of the at least one dataset, an identifier per column to have an entropy of the column changed, or an indication of the defined order of the one or more transformation modules.

11. The computer-implemented method of claim 4, wherein a test of the one or more tests is a test to measure a relative change in an evaluation metric on consecutive subsets of data.

12. The computer-implemented method of claim 4, wherein a test of the one or more tests is a test to measure a change in an evaluation metric when a model is retrained with a same training data as the model was previously trained on and tested with a same testing data.

13. A system comprising:
a first one or more computing devices comprising one or more processors to implement a storage service in a multi-tenant provider network;
a second one or more computing devices comprising one or more processors to implement a synthetic data generation service in the multi-tenant provider network, the synthetic data generation service including instructions that, upon execution by the one or more processors, cause the synthetic data generation service to:
receive a request to generate synthetic data;
generate the synthetic data according to the request by:
selecting one or more transformation modules to be used to generate the synthetic data,
instantiating the one or more transformation modules, and
applying the one or more transformation modules in a defined order to at least one dataset stored by the storage service to generate the synthetic data; and
store the synthetic data; and
a third one or more computing devices comprising one or more processors to implement a model testing service in the multi-tenant provider network, the model testing service including instructions that, upon execution by the one or more processors, cause the model testing service to:
receive a request to test a machine learning (ML) model using the synthetic data;
test the ML model according to the request using one or more tests implemented as code executing on the one or more processors, wherein a test of the one or more tests is a test to quantify, as a mean weighted consistency value, a prediction of individual data points when each feature receives an out-of-bounds value; and
generate a graphical output representing one or more results of the one or more tests.

14. The system of claim 13, wherein selecting the one or more transformation modules is in response to a user selection of one or more particular transformation modules.

15. The system of claim 13, wherein the defined order is provided by the request to generate the synthetic data.

16. The system of claim 13, wherein the generating of the synthetic data is performed in response to the request that includes one or more of: an indication of a location of the at least one dataset, the at least one dataset, an indication of a location to store the synthetic data, an indication of the one or more transformation modules, an indication to use a random set of one or more transformation modules, an indication of a goal for the synthetic data, an indication of entropy to use for one or more columns of the at least one dataset, an identifier per column to have an entropy of the column changed, or an indication of the defined order of the one or more transformation modules.

17. The system of claim 13, wherein the one or more transformation modules are randomly selected.

18. The system of claim 13, wherein the one or more transformation modules are selected based at least in part on a data perturbation goal.

19. The system of claim 13, wherein a test of the one or more tests is a test to measure a relative change in an evaluation metric on consecutive subsets of data.

20. The system of claim 13, wherein a test of the one or more tests is a test to measure a change in an evaluation metric when a model is retrained with a same training data as the model was previously trained on and tested with a same testing data.

* * * * *